US012764717B2

(12) United States Patent
Esswie

(10) Patent No.: US 12,764,717 B2
(45) Date of Patent: Oct. 13, 2026

(54) ON-DEMAND PAGING OF EMERGENCY SERVICES

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 384 days.

(21) Appl. No.: 18/599,926

(22) Filed: Mar. 8, 2024

(65) Prior Publication Data

US 2025/0287353 A1 Sep. 11, 2025

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC .............................. H04W 68/02; H04W 76/28
USPC .......................................................... 455/458
See application file for complete search history.

(56) References Cited

U.S. PATENT DOCUMENTS

2010/0323683 A1* 12/2010 Kazmi .................. H04W 64/00 455/422.1
2011/0136465 A1* 6/2011 Ekemark ................. H04W 4/90 455/404.1
2014/0200014 A1* 7/2014 Iwai ........................ H04W 4/90 455/450
2021/0410107 A1* 12/2021 Park ...................... H04W 68/02
2024/0023195 A1* 1/2024 Kim ....................... H04W 76/28
2024/0267984 A1* 8/2024 Jeon ...................... H04W 76/28
2024/0340795 A1* 10/2024 Kim ...................... H04L 1/1887
2025/0287354 A1* 9/2025 Esswie .................. H04W 76/50
2025/0393101 A1* 12/2025 Ahluwalia .......... H04W 68/025

* cited by examiner

*Primary Examiner* — Michael R Neff
(74) *Attorney, Agent, or Firm* — Amin, Turocy & Watson, LLP

(57) ABSTRACT

A radio network node may receive, from a core network, an on-demand paging configuration comprising an indication to enable synchronization signal block transmission during discontinuous transmit off operation. The node may configure user equipment to be associated with a paging occasion group corresponding to one or more paging occasion resources. The node may broadcast a paging message indication via a synchronization signal block during a discontinuous transmit off period. The node may broadcast, using a broadcast scrambling code, a paging message indication via a configured emergency paging occasion if synchronization signal block transmission during discontinuous transmit off has not been enabled. A paging message indication may comprise a paging occasion group indication. User equipment corresponding to a paging occasion group indicated in a paging message indication may receive a paging message transmitted by the node, during configured discontinuous transmit off operation, via a paging occasion corresponding to the group.

20 Claims, 19 Drawing Sheets

100

200

300

210

700

800

900

1100

1200

1300

1400

1500

1600

ON-DEMAND PAGING OF EMERGENCY SERVICES

BACKGROUND

The 'New Radio' (NR) terminology that is associated with fifth generation mobile wireless communication systems ("5G") refers to technical aspects used in wireless radio access networks ("RAN") that comprise several quality-of-service classes (QOS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio network node comprising at least one processor, transmitting, to at least one user equipment, an emergency paging occasion configuration indicative of at least one emergency paging resource usable by the at least one user equipment to facilitate receiving at least one paging message during facilitation of enabling at least one discontinuous transmit off period by the radio network node. The method may comprise facilitating, by the radio network node, activating a discontinuous transmit off period to result in an activated discontinuous transmit off period. The method may comprise facilitating, by the radio network node, receiving, from a computer network communicatively coupled with the radio network node, an emergency paging message directed to at least one of the at least one user equipment. The computer network communicatively coupled with the radio network node may comprise a core network or a radio access network corresponding to the radio network node. The method may further comprise facilitating, by the radio network node, broadcasting an emergency paging message indication, during the activated discontinuous transmit off period, indicative of the emergency paging message to be transmitted by the radio network node via at least one non-emergency paging occasion resource during the activated discontinuous transmit off period, and facilitating, by the radio network node, transmitting the emergency paging message via at least one non-emergency paging occasion during the activated discontinuous transmit off period.

The emergency paging message indication may comprise an emergency paging activation period indication indicative of an emergency activation period during which the at least one non-emergency paging occasion resource is to be usable by the at least one user equipment to receive the emergency paging message during the activated discontinuous transmit off period. The emergency paging activation period indication may be indicated by the emergency paging message indication as at least one frame or as at least one super frame.

In an embodiment, the method may further comprise facilitating, by the radio network node, receiving, via the computer network communicatively coupled with the radio network node, an on-demand emergency paging configuration comprising at least one of an emergency synchronization signal block activation indication indicative to the radio network node to activate broadcasting of at least one synchronization signal block signal during the activated discontinuous transmit off period, or at least one paging occasion resource indication, indicative of the at least one non-emergency paging resource, associated with at least one paging occasion group indication indicative that the at least one non-emergency paging resource is to be usable, during the activated discontinuous transmit off period, by at least one user equipment corresponding to the at least one non-emergency paging resource.

The emergency paging message indication may comprise at least one of the at least one paging occasion group indication.

The on-demand emergency paging configuration may further comprise an emergency information block enablement indication indicative that the radio network node is to enable broadcasting of emergency information block messages during the activated discontinuous transmit off period, wherein the emergency paging message indication is broadcast via a master information block message.

The on-demand emergency paging configuration may further comprise an emergency information block enablement indication indicative that the radio network node is to enable broadcasting of emergency information block messages during the activated discontinuous transmit off period, and wherein the emergency paging message indication is broadcast via an emergency system information block message indicated by a master information block message broadcast by the radio network node.

An emergency information block enablement indication may be indicative of enablement of broadcasting of emergency information block messages during the activated discontinuous transmit off period is absent from the on-demand emergency paging configuration. The at least one emergency paging resource may comprise at least one emergency paging occasion resource usable by the at least one user equipment to receive the emergency paging message indication. Broadcasting of the emergency paging message indication may comprise transmitting the emergency paging message indication via the at least one emergency paging occasion resource. The emergency paging message indication may be scrambled with a broadcast scrambling code. The emergency paging message comprises at least one of the at least one paging group indication indicative to the at least one user equipment to monitor the at least one non-emergency paging occasion resource to facilitate receiving the emergency paging message. In an embodiment, the emergency paging message indication may exclude user equipment identifiers corresponding to user equipment associated with the at least one paging group indication. The emergency paging occasion configuration may further comprise an emergency paging activation period indication indicative of an emergency activation period during which the at least one non-emergency paging occasion resource is to be usable by the at least one user equipment to receive the emergency paging message during the activated discontinuous transmit off period. The emergency paging message indication may comprise an emergency paging activation period indication indicative of an emergency activation period during which the at least one non-emergency paging occasion is to be usable by the at least one user equipment to receive the emergency paging message during the activated discontinuous transmit off period.

In another example embodiment, a radio network node may comprise at least one processor configured to process executable instructions that, when executed by the at least one processor, facilitate performance of operations that may comprise receiving an on-demand emergency paging configuration, directed to the radio network node via a first computing network element, comprising at least one paging occasion group indication, associated with at least one paging group indication, indicative of at least one emergency paging resource to be usable by at least one user equipment corresponding to the at least one paging group indication, and transmitting, to at least one user equipment, an emergency paging occasion configuration indicative of at least one of the at least one emergency paging resource usable by the at least one user equipment to facilitate receiving at least one paging message during facilitation of at least one discontinuous transmit off period by the radio network node. The operations may comprise activating a discontinuous transmit off period to result in an activated discontinuous transmit off period and receiving an emergency paging message directed to at least one of the at least one user equipment via a second computing network element. The operations may further comprise broadcasting an emergency paging message indication, during the activated discontinuous transmit off period, indicative of the emergency paging message to be transmitted by the radio network node via the at least one emergency paging resource during the activated discontinuous transmit off period and transmitting the emergency paging message via at least one non-emergency paging occasion resource during the activated discontinuous transmit off period.

The on-demand emergency paging configuration may further comprise an emergency synchronization signal block activation indication indicative to the radio network node to activate broadcasting of at least one synchronization signal block signal during the activated discontinuous transmit off period.

In an embodiment, the on-demand emergency paging configuration may further comprise an emergency information block enablement indication indicative that the radio network node is to enable broadcasting of emergency information block messages during the activated discontinuous transmit off period. The operations further comprise broadcasting, via the at least one emergency paging resource, an emergency master information block message, wherein the emergency master information block message is indicative of a system information block message that comprises the emergency paging message indication indicative of the at least one non-emergency paging occasion resource and broadcasting the system information block message.

In yet another example embodiment, a non-transitory machine-readable medium may comprise executable instructions that, when executed by at least one processor of a radio network node, facilitate performance of operations that may comprising transmitting, to at least one user equipment, an emergency paging occasion configuration indicative of at least one emergency paging resource usable by the at least one user equipment to facilitate receiving at least one paging message during at least one discontinuous transmit off period implemented by the radio network node. The operations may comprise activating a discontinuous transmit off period to result in an activated discontinuous transmit off period and receiving an emergency paging message directed to at least one of the at least one user equipment. The operations may further comprise broadcasting, via the at least one emergency paging resource during the activated discontinuous transmit off period, an emergency paging message indication indicative that the emergency paging message is to be transmitted by the radio network node to the at least one user equipment via at least one non-emergency paging occasion corresponding to the at least one user equipment during the activated discontinuous transmit off period and transmitting the emergency paging message via the at least one non-emergency paging occasion corresponding to the at least one user equipment during the activated discontinuous transmit off period. The at least one emergency paging resource may be an emergency paging occasion. The emergency paging message indication may be broadcast via the emergency paging occasion.

In an embodiment, the emergency paging message indication may be indicative of the at least one non-emergency paging occasion.

The emergency paging occasion configuration may comprise at least one paging occasion group indication and at least one paging occasion resource indication associated with the at least one paging occasion group indication. The at least one paging occasion resource indication may be indicative of at least one non-emergency paging occasion that the at least one user equipment is configured to monitor during non-active discontinuous off periods. The emergency paging message may be multicast to at least one user equipment, configured to monitor the at least one non-emergency paging occasion, according to encoding information corresponding to the at least one user equipment.

In an embodiment, the operations may further comprise receiving, from a core network device, an on-demand emergency paging configuration further comprises an emergency information block enablement indication indicative that the radio network node is to enable broadcasting of emergency information block messages during the activated discontinuous transmit off period. Based on the emergency information block enablement indication being indicative to enable broadcasting of synchronization signal block messages, the operations may further comprise broadcasting a master information block message that is indicative of an emergency system information block message that comprises the emergency paging message indication indicative of the at least one non-emergency paging occasion and broadcasting the emergency system information block message during the activated discontinuous transmit off period.

In another example embodiment, a method may comprise receiving, by at least one user equipment comprising at least one processor from a radio network node, an emergency paging occasion configuration comprising at least one emergency paging resource indication indicative of at least one emergency paging resource usable to facilitate receiving, by the at least one user equipment, at least one paging message during at least one discontinuous transmit off period enabled at least in part by the radio network node. The method may further comprise receiving, by the at least one user equipment from the radio network node during the at least one discontinuous transmit off period, an emergency paging message indication indicative of an emergency paging message to be transmitted by the radio network node to the at least one user equipment via at least one non-emergency paging occasion during the at least one discontinuous transmit off period. The method may further comprise receiving, by the at least one user equipment from the radio network node, the emergency paging message via the at least one non-emergency paging occasion during the at least one discontinuous transmit off period.

The emergency paging message indication may comprise an emergency paging activation period indication indicative of an emergency activation period during which the at least one emergency paging resource is to be usable by the at least one user equipment to receive the emergency paging message during the at least one discontinuous transmit off period. The emergency paging activation period indication may be indicated in the emergency paging occasion configuration as being at least one frame or at least one super frame.

The emergency paging occasion configuration may further comprise at least one of: an emergency synchronization signal block activation indication indicative that the radio network node is configured to activate broadcasting of at least one synchronization signal block signal during the at least one discontinuous transmit off period, at least one paging occasion group indication, associated with at least one non-emergency paging occasion resource usable by at least one user equipment corresponding to the at least one paging occasion group indication, at least one emergency paging occasion resource indication indicative of at least one emergency paging occasion time resource or at least one emergency paging occasion frequency resource, or at least one emergency scrambling code usable by the at least one user equipment to decode emergency paging message indications broadcast via the at least one emergency paging occasion time resource or emergency paging occasion frequency resource during the at least one discontinuous transmit off period.

The at least one user equipment may be one of the at least one user equipment corresponding to the at least one paging occasion group indication. Based on the at least one paging occasion group indication being indicative of at least one paging occasion resource corresponding to the at least one user equipment, the method may further comprise halting, by the at least one user equipment, decoding at least one non-emergency paging occasion corresponding to the at least one paging occasion group indication during the at least one discontinuous transmit off period. Based on the emergency synchronization signal block activation indication being indicative that the radio network node is configured to broadcast at least one emergency synchronization signal block signal during the activated discontinuous transmit off period and based on the at least one emergency paging resource indication being indicative of at least one emergency synchronization signal block signal resource, the method may further comprise receiving, by the at least one user equipment, at least one emergency synchronization signal block message broadcast by the radio network node according to the at least one emergency synchronization signal block signal resource during the at least one discontinuous transmit off period. The emergency paging message indication may be broadcast by the radio network node during the at least one discontinuous transmit off period via the at least one emergency synchronization signal block message. The emergency paging message indication may comprise at least one of the at least one paging occasion group indication that corresponds to a user equipment paging group that comprises the at least one user equipment.

In an embodiment, based on the emergency paging message indication comprising the at least one of the at least one paging occasion group indication being indicative of at least one paging occasion resource corresponding to the at least one user equipment, the method may further comprise resuming, by the at least one user equipment during the at least one discontinuous transmit off period, decoding at least one of the at least one non-emergency paging occasion corresponding to the user equipment.

The at least one emergency synchronization signal block message broadcast by the radio network node during the at least one discontinuous transmit off period may be a master information block signal message.

The at least one emergency synchronization signal block message broadcast by the radio network node during the at least one discontinuous transmit off period may be a system information block signal message.

In an embodiment, an emergency synchronization signal block activation indication indicative that the radio network node is configured to activate broadcasting of at least one synchronization signal block signal during the at least one discontinuous transmit off period may be absent from the emergency paging occasion configuration. The at least one paging group indication may be indicative of at least one user equipment paging group that comprises the at least one user equipment. Based on the at least one paging group indication being indicative of at least one user equipment paging group that comprises the at least one user equipment, the method may further comprise halting, by the at least one user equipment, decoding the at least one non-emergency paging occasion during the at least one discontinuous transmit off period, and using, by the at least one user equipment during the at least one discontinuous transmit off period, the at least one emergency scrambling code to decode the emergency paging message indication received via the at least one emergency paging occasion time resource or the at least one emergency paging occasion frequency resource, to result in a decoded emergency paging message indication.

In an embodiment, the method may further comprise determining, by the at least one user equipment, that the decoded emergency paging message indication comprises a paging group indication indicative of at least one user equipment paging group comprising the at least one user equipment to result in a determined paging group indication. Based on the determined paging group indication being indicative of a user equipment paging group that comprises the at least one user equipment, the method may further comprise resuming, by the at least one user equipment during the at least one discontinuous transmit off period, decoding the at least one non-emergency paging occasion to facilitate the receiving of the emergency paging message.

In an embodiment, the at least one non-emergency paging occasion via which the emergency paging message is received during the at least one discontinuous transmit off period may be a paging occasion configured for use by the at least one user equipment during active transmission periods during which discontinuous transmit off is inactive at the radio network node. The at least one non-emergency paging occasion may correspond to a paging occasion group associated, in the emergency paging occasion configuration, with a paging group indication that is indicative of a user equipment paging group that comprises the at least one user equipment.

In another example embodiment, a user equipment may comprise at least one processor configured to process executable instructions that, when executed by the at least one processor, facilitate performance of operations that may comprise receiving, from a radio network node, an emergency paging resource indication indicative of an emergency paging resource usable to facilitate receiving, by the user equipment, paging messages during discontinuous transmit off periods facilitated by the radio network node. The operations may further comprise receiving, from the radio network node during a discontinuous transmit off period facilitated by the radio network node via the emergency paging resource, an emergency paging message indication indicative of an emergency paging message to be transmitted by the radio network node to the user equipment via a configured paging occasion during at least one discontinuous transmit off period and receiving, by the user equipment from the radio network node, the emergency paging message via the configured paging occasion during the at least one discontinuous transmit off period.

The configured paging occasion may be a non-emergency paging occasion, configured by the radio network node, usable by the user equipment to receive paging messages transmitted by the radio network node when discontinuous transmit off is deactivated by the radio network node. The configured paging occasion may correspond to a paging occasion group that corresponds to the user equipment. The operations may further comprise receiving, from the radio network node, a paging occasion group indication indicative of the user equipment paging occasion group. The receiving of the emergency paging message indication may be based on the paging occasion group indication being indicative of at least one paging occasion resource corresponding to the at least one user equipment.

The emergency paging message indication may be received via the emergency paging resource that comprises at least one emergency paging occasion resource. The receiving of the emergency paging message indication may further comprise decoding the at least one emergency paging occasion resource using group-specific decoding information that is specific to the paging occasion group indicated by the paging occasion group indication.

In an embodiment, the operations may further comprise responsive to the receiving of the of the emergency paging message, initiating transitioning from an idle mode to a connected mode with respect to the radio network node; and receiving traffic corresponding to, or indicated by, the emergency paging message.

In yet another example embodiment, a non-transitory machine-readable medium may comprise executable instructions that, when executed by at least processor of a user equipment, facilitate performance of operations that may comprise receiving, from a radio network node, an emergency paging occasion configuration comprising at least one emergency paging resource indication indicative of at least one emergency paging resource usable to facilitate receiving, by the user equipment, at least one paging message during at least one discontinuous transmit off period facilitated by the radio network node. The operations may further comprise receiving, from the radio network node during the at least one discontinuous transmit off period, an emergency paging message indication indicative of an emergency paging message to be transmitted by the radio network node to the user equipment via at least one non-emergency paging occasion during the at least one discontinuous transmit off period and receiving, from the radio network node during the at least one discontinuous transmit off period, the emergency paging message via the at least one non-emergency paging occasion.

The at least one emergency paging resource may correspond to an emergency paging occasion that is decodable using an emergency scrambling code indicated by the emergency paging occasion configuration. The emergency paging message indication may be received via the emergency paging occasion.

The at least one emergency paging resource may comprise an emergency synchronization signal block resource. The emergency paging message indication is received via the emergency synchronization signal block resource.

The at least one non-emergency paging occasion, via which the emergency paging message may be received, may be at least one configured paging occasion that the user equipment may be configured to use to receive paging messages during at least one discontinuous transmit off deactivation period during which the at least one discontinuous transmit off period is deactivated by the radio network node.

DETAILED DESCRIPTION OF THE DRAWINGS

Figure 1:
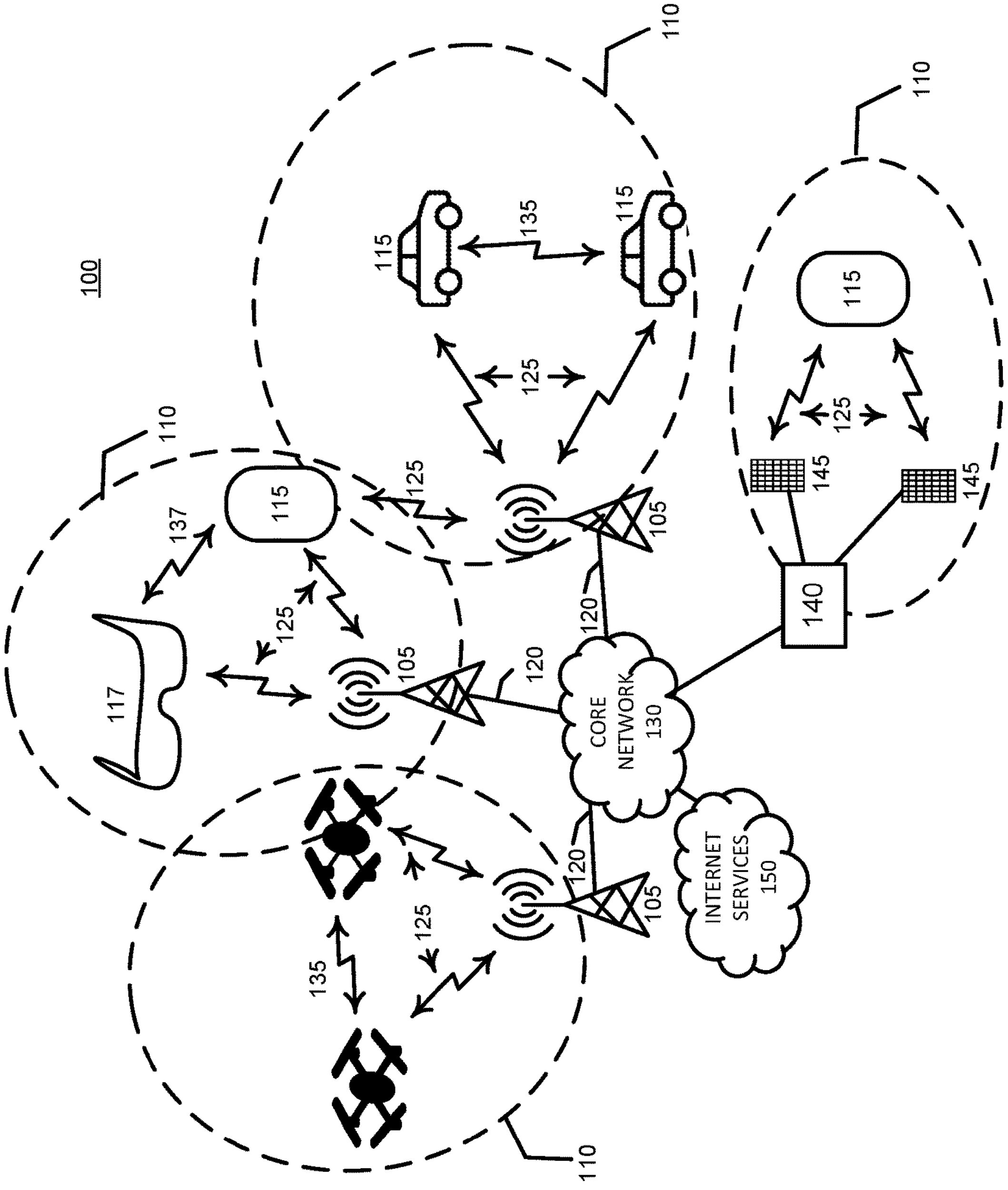
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN node, or a component thereof, may be implemented by one or more computer components, or by software executed thereby, that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term “carrier” may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a “system bandwidth” of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Network energy saving ("NES"), and minimizing energy consumption, is a desirable goal. Achievement of NES gain may be desirable regardless of cell/radio link conditions (e.g., traffic and device loading conditions, handover states, etc.). Thus, operators of mobile networks can dynamically (e.g., in real time or with respect to time) trade off performance with respect to certain radio functionalities in exchange for increasing NES. Network discontinuous transmission ("DTX") may facilitate NES increases. During a full DTX off period, a RAN node may fully shut down a transmitter, corresponding to the RAN node, with respect to all radio signals. Accordingly, during a full DTX off period, a RAN node may skip transmitting radio signals, including signals that may comprise data and control payload, and thus achieve significant NES gains. However, with respect to commercial radio access networks, RAN nodes are effectively blocked from activating DTX off for extended periods due to regulatory requirements to periodically broadcast signals that are effectively multiple sets of 'always-on' periodic radio resources to facilitate carrying potential paging indications towards idle mode user equipment devices that may be indicative of incoming calls or data updates.

User equipment operating in idle mode or inactive mode typically is/are in a state of deep sleep (e.g., transceiver chains are inactive) there is no incoming traffic or services for the user equipment to perform. However, to facilitate an idle/inactive user equipment becoming aware of incoming downlink payload, the user equipment is typically configured with a set of periodic paging occasions within certain radio frames during which the user equipment is to wake up, monitor, and determine if there is a paging indication directed to the UE. For example, in RRC IDLE mode or RRC INACTIVE mode, a user equipment may wake up according to a configured paging cycle paging occasion to determine whether the user equipment is being paged during the paging occasion. According to conventional techniques, to transition to an RRC CONNECTED state and receive a paging message, a user equipment may attempt re-synchronizing with a RAN node by detecting at least a single synchronization signal block ("SSB"), since a UE may not be synchronized with the radio interface due to a long sleep/inactive transceiver period. Different UEs, with different implementations (e.g., UEs supplied from different vendors or configured for different applications or purposes) may require a different number of SSBs/radio sequences to synchronize with the RAN node. For example, a user equipment experiencing good signal-to-interference-noise-ratio ("SINR") conditions with a RAN node may be able to re-synchronize with the node by detecting a single SSB/sequence whereas a UE experiencing poor SINR conditions may require additional SSB detection attempts. After a UE is synchronized with a RAN node, the UE may attempt to blindly decode a paging downlink control information ("DCI") message transmitted by the RAN node via a possible physical downlink control channel occasion. Blind decoding is a power-consuming operation because a user equipment is not yet connected to the network, and thus, being unaware of paging transmission configuration information, such as, for example, a modulation and coding scheme, the UE typically attempts blind decoding according to multiple, or all, possible encodings with respect to the paging DCI message. The paging DCI message may indicate to an idle/inactive UE that there is at least a single UE with incoming traffic in the downlink direction. In case there is no paging DCI detected via the PDCCH resources, an idle/inactive UE may assume that there is no paging being conveyed via a current paging opportunity, and thus the UE may continue sleeping until waking up at a next configured paging occasion. If an idle/inactive UE detects the presence of a paging DCI during a configured paging occasion the UE may decode a corresponding subsequent physical downlink shared channel data resource to read a paging record/paging message. The paging record/message may indicate one or more identifier(s) corresponding to one or more idle/inactive UE(s) that is/are being paged. From the perspective of a user equipment, if a paging record contains a temporary identifier corresponding to the user equipment, the user equipment may trigger a random-access procedure with respect to a RAN node that transmitted the DCI to facilitate transitioning to an RRC CONNECTED state.

According to conventional techniques, one or more tradeoffs may be implemented to achieve a desired level of paging performance, including increasing number/frequency of paging occasion occurrences and paging DCIs to result in less packet buffering delay and minimized device reachability delay. However, to facilitate an increased number of paging occasion occurrences, a user equipment wakes up more often thus negatively impacting battery consumption performance at the user equipment. In addition, more frequent paging DCI messages result in a larger size of a physical downlink control channel set ("CORESET"), and thus less remaining PDCCH resources usable for other control and scheduling information and less overall bandwidth part data resources usable for data transmissions via a physical downlink shared channel.

Although paging in general may facilitate reasonable idle mode and access performance, paging is considered to be a network-energy-inefficient operation. Paging facilitates a RAN node, with respect to which one or more user equipment may have been last connected, to reach/contact/connect with a certain device (e.g., when triggered by core network equipment to facilitate receiving an incoming voice call) by broadcasting a paging indication that indicates an identifier associated with one or more to-be-paged user equipment. The broadcast paging indication may indicate transmission of a downlink control channel, indicative of a scheduled paging data channel, via which one or more paging messages associated with the one or more user equipment are transmitted.

Global regulations may mandate that RAN nodes must be awake, with DTX off mode deactivated, during any available/configured paging occasion resource, to facilitate broadcasting of paging indications corresponding to incoming emergency updates or calls. Thus, due to regulations, a RAN node cannot avoid broadcasting of an incoming paging indication corresponding to an incoming emergency call or update, and thus effective NES gain achievable by network DTX off operation is significantly reduced.

According to conventional techniques, a RAN node facilitates paging resources and occasions being 'always on'. Thus, even if one or more paging message(s) is not directed to a RAN node for transmission thereby to one or more user equipment, the RAN node, as well as the user equipment, must be awake and operational during configured paging resources and paging occasions 'just in case'. Embodiments disclosed herein may facilitate distinguishing between paging for emergency services and paging for non-emergency services and may facilitate a RAN node adopting different operation with respect to paging during a DTX off period based on a type and criticality of a paging message and a configured resource corresponding thereto.

According to one or more embodiments disclosed herein, a RAN node may broadcast an emergency paging message indication within a configured short emergency paging occasion. A RAN node may interrupt a DTX off period and activate paging occasions to facilitate user equipment devices making adjustment to corresponding paging monitoring behavior to receive an emergency call or emergency update. Conventional techniques do not facilitate use of a special paging occasion to indicate dynamic, real-time activation of another full/regular paging occasion based on an actual received paging message.

Embodiments disclosed herein may facilitate dynamic emergency paging delivery towards an intended user equipment device while allowing RAN nodes to adopt/implement DTX off mode operation for extended periods to increase NES gains while complying with regulatory requirements to always timely deliver emergency paging messages. Embodiments disclosed herein may facilitate disaggregating RAN paging for emergency services from RAN paging of non-emergency services, and accordingly may facilitate a RAN node dynamically maintaining DTX off operation during non-emergency paging periods and dynamically discarding or delaying broadcasting of non-emergency paging indications while still timely serving and broadcasting emergency paging indications and paging messages corresponding thereto.

Figure 2:
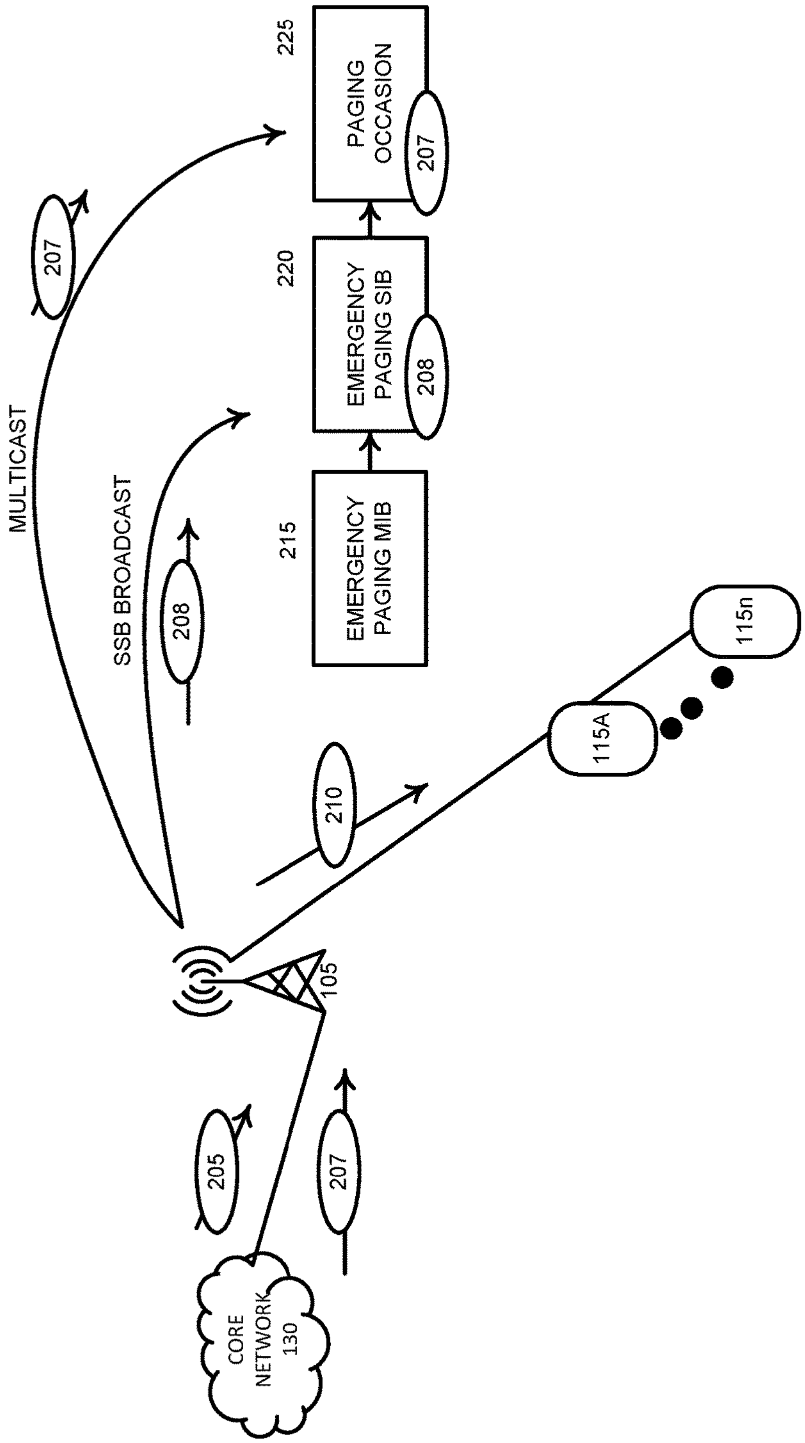
FIG. 2 illustrates an example environment with user equipment receiving a paging message indication via synchronization signal block signals during a configured discontinuous transmit off period at a serving radio access network node.
Figure 4:
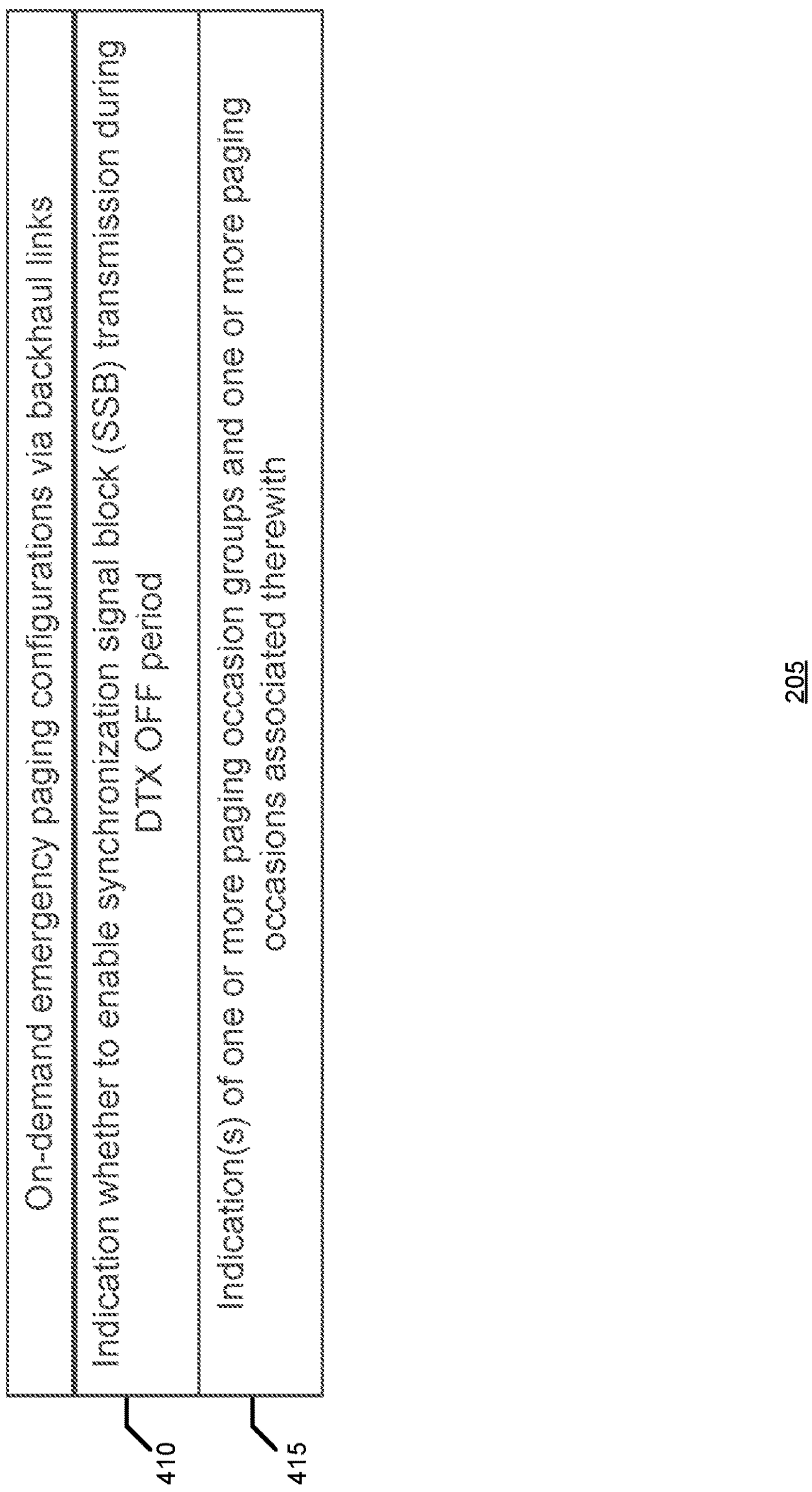
FIG. 4 illustrates an example emergency paging occasion configuration.

Turning now to FIG. 2, environment 200 comprises user equipment 115A-115*n* having selected, or having accessed and camped-on, radio access network node 105. RAN node 105 may receive, from core network equipment 130, on-demand emergency paging configuration 205, that may be indicative of information that may be usable by user equipment 115A-115*n* to receive an emergency paging message during a discontinuous transmit off period activated by RAN node 105 (e.g., during a period that the RAN node shuts down at least one transmitter). As shown in FIG. 4, configuration 205 may comprise an emergency synchronization signal block activation indication 410 indicative to radio network node 105 to activate broadcasting of at least one synchronization signal block signal during an activated DTX off period; or at least one paging occasion group indication 415 indicative of at least one paging group and at least one emergency paging resource that is usable by at least one user equipment corresponding to the at least one paging group indication to receive an emergency paging message transmitted by a RAN node 105 during a DTX off period activated by the RAN node. Indication 410 may be a binary indication indicative to the RAN node whether to activate synchronization signal block transmission during a DTX OFF period. Indication 415 may comprise information that indicates to a user equipment, that is a member of a group indicated in indication 415, to use a configured standard paging occasion resource per radio frame that is associated with a paging group that comprises the user equipment to receive an emergency paging message.

RAN node 105 may transmit/broadcast paging occasion group information configuration 210. Configuration 210 may be referred to as an emergency paging occasion configuration indicative of at least one emergency paging resource usable by the at least one user equipment to facilitate receiving at least one paging message during DTX off periods activated by the radio network node. Configuration 210 may be transmitted by RAN node 105 via radio interface links 125 between the RAN node and one or more user equipment 115A-115*n*. Configuration 215 may comprise information indicative of at least one paging group and at least one paging occasion resource, corresponding to at least one paging occasion resource, associated with the at least one paging group.

During an activated discontinuous transmit off period activated by RAN node 105, which may be referred to as an activated discontinuous transmit off period, RAN node 105 may receive, from a computer network communicatively coupled with the radio network node, an emergency paging message 207 directed to at least one of the at least one user equipment (e.g., the RAN may receive from a radio access network comprising node 105 or from a core network, such as core network 130 shown in FIG. 1, a paging message directed to at least one of user equipment 115A-115*n*). RAN node 105 may transmit/broadcast an emergency paging message indication 208, during the activated discontinuous transmit off period. Emergency paging message indication 208 may be indicative of emergency paging message 207 to be transmitted by the radio network node via at least one non-emergency paging occasion resource during the activated discontinuous transmit off period. In an embodiment, emergency paging message indication 208 may be broadcast via MIB 215. In an embodiment, emergency paging message indication 208 may be broadcast via emergency paging SIB 220, which may be indicated by an emergency SIB indication indicated by MIB 215. RAN node 105 may transmit emergency paging message 207 via non-emergency paging occasion 225 during a period configured to be an activated discontinuous transmit off period. Non-emergency paging occasion 225 may correspond to at least one non-emergency paging resource, with respect to which at least one UE 115A-115*n* may be configured to receive paging messages when RAN node 105 is not operating during a configured activated DTX off period (e.g., a non-emergency paging occasion may be a paging occasion configured according to conventional techniques to be used by the at least one UE to receive paging messages).

Figure 19:
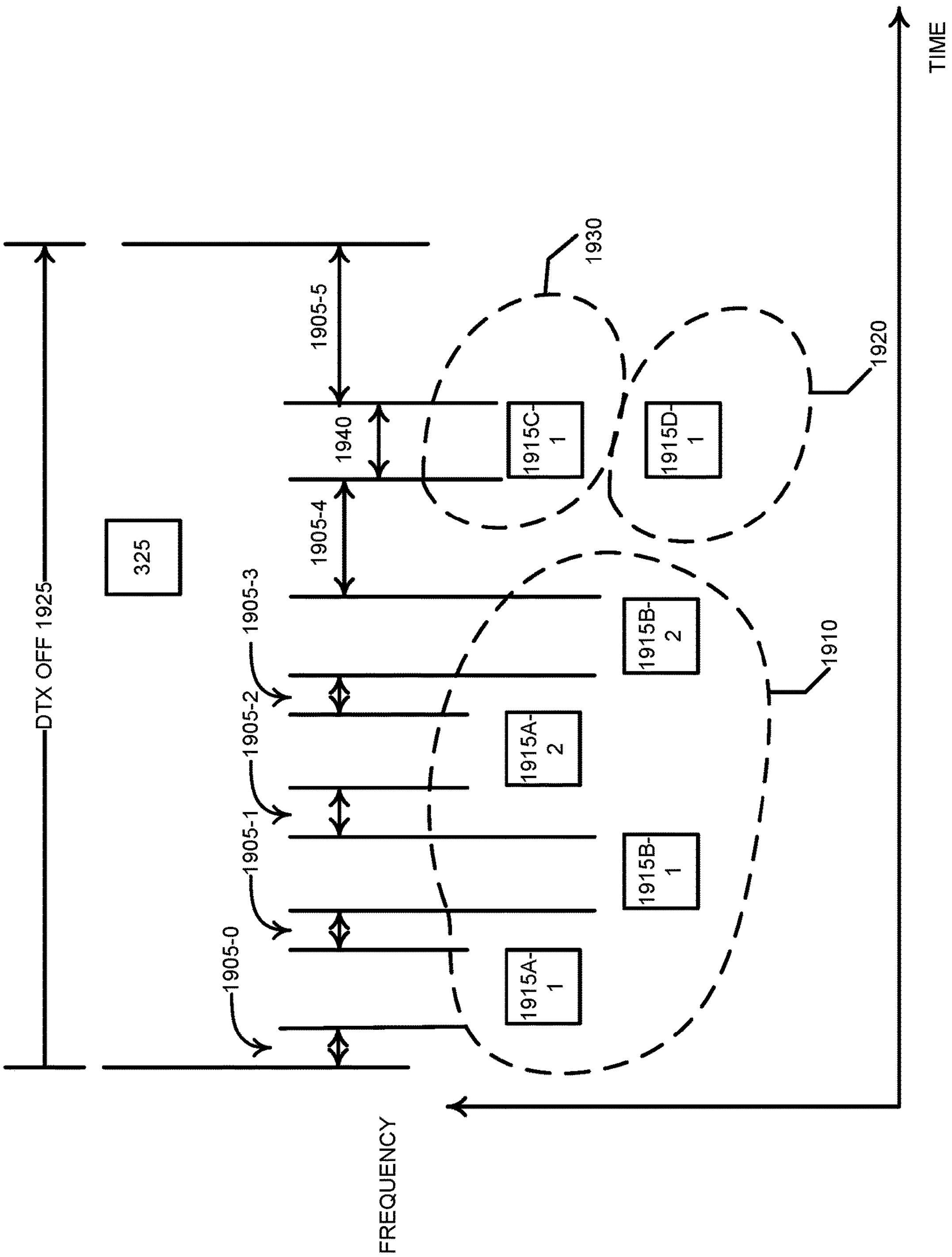
FIG. 19 illustrates example paging occasion resources that have been configured as group paging occasion resources associated with at least one paging group.

Examples of configured non-emergency paging occasion resources are illustrated in FIG. 19. At least one user equipment may correspond to paging group 1910 and may be configured to monitor non-emergency paging resources 1915A and 1915B. At least one user equipment may correspond to paging group 1920 insofar as the at least one user equipment may be configured to monitor non-emergency paging occasion resources 1915C. According to conventional techniques, during DTX off period 1925 user equipment corresponding to group 1910 may be configured to monitor paging resource resources 1915A and 1915B, user equipment corresponding to group 1920 may be configured to monitor paging resources 1915D, and user equipment corresponding to group 1930 may be configured to monitor paging resources 1915C. Thus, RAN node 105, shown in FIG. 2, may deactivate DTX off period 1925 during paging resource occasions 1915, leaving only time during gaps 1905 as periods during period 1925 that RAN node 105 may activate DTX off period 1925 (e.g., RAN node 105 must avoid turning off at least one transmitter during all of paging occasion resources 1915).

Unlike operation according to conventional techniques, operation according to an embodiment illustrated in FIG. 2 may facilitate only deactivating DTX off during a paging occasion corresponding to a paging occasion group indicated in configuration 210 instead of deactivating DTX off during all configured paging occasions. For example, if a paging message 207 is directed to UE 115A, which may be configured to, correspond to, or be configured to monitor paging occasion resources corresponding to paging group 1910 shown in FIG. 19, RAN node 105 may deactivate DTX off period 1925 during paging resource occasions 1915A or 1915B, but may activate DTX off operation during the remainder of period 1925, even during paging resource occasions 1915C or 1915D. Similarly, if a paging message 207 is directed to UE 115K, which may belong to, correspond to, or be configured to monitor paging occasion resources corresponding to paging group 1930 shown in FIG. 19, RAN node 105 may deactivate DTX off period 1925 during paging occasion resource 1915C (which is shown overlapping occasion resource 1915D), but may activate DTX off operation during the remainder of period 1925, even during paging resource occasions 1915A or 1915B (e.g., the RAN node may turn off transmitters during resource occasions 1915A and 1015B during period 1925 that is configured to be an active DTX off period).

In an embodiment, on condition of RAN 105, shown in FIG. 2, receiving an emergency paging message 207, from core network 130 (e.g., the RAN node receives an incoming paging message request triggered due to an available emergency call or emergency service directed to user equipment 115A) during an active RAN DTX off period, wherein configuration 205 indicates that SSB transmission during DTX off is enabled, RAN node 105 may transmit an emergency paging indication, which may be a binary indication, or bit, as part of master information block 215 or as part of an available system information block. The binary paging indication indicated in MIB 215, or an available SIB, may indicate to UE 115A to monitor special emergency SIB 220 RAN. RAN node 105 may transmit special emergency paging SIB 220, which may indicate that user equipment, corresponding to one or more paging occasion groups and corresponding to certain paging occasion resources, for example resources 1915A corresponding to occasion group 1910, are to monitor at least one of the certain paging occasion resources (e.g., resources corresponding to paging occasion 225, which may be one of configured paging occasion 1915A, for example occasion 1915A-2 as indicated in special SIB 220). Special emergency SIB 220 may indicate an activation period in terms of frames or super frames. Thus, for example, SIB 220 may indicate that one, fewer than all, or all paging resource occasions 1915A may be activated during an activated DTX off period. It will be appreciated that even though resources 1915A and 1915B corresponds to paging group 1910, RAN node 105 may activate DTX off during resource occasions 1915B even though DTX off may be deactivated during paging resource occasions 1915A, or vice versa.

Figure 6:
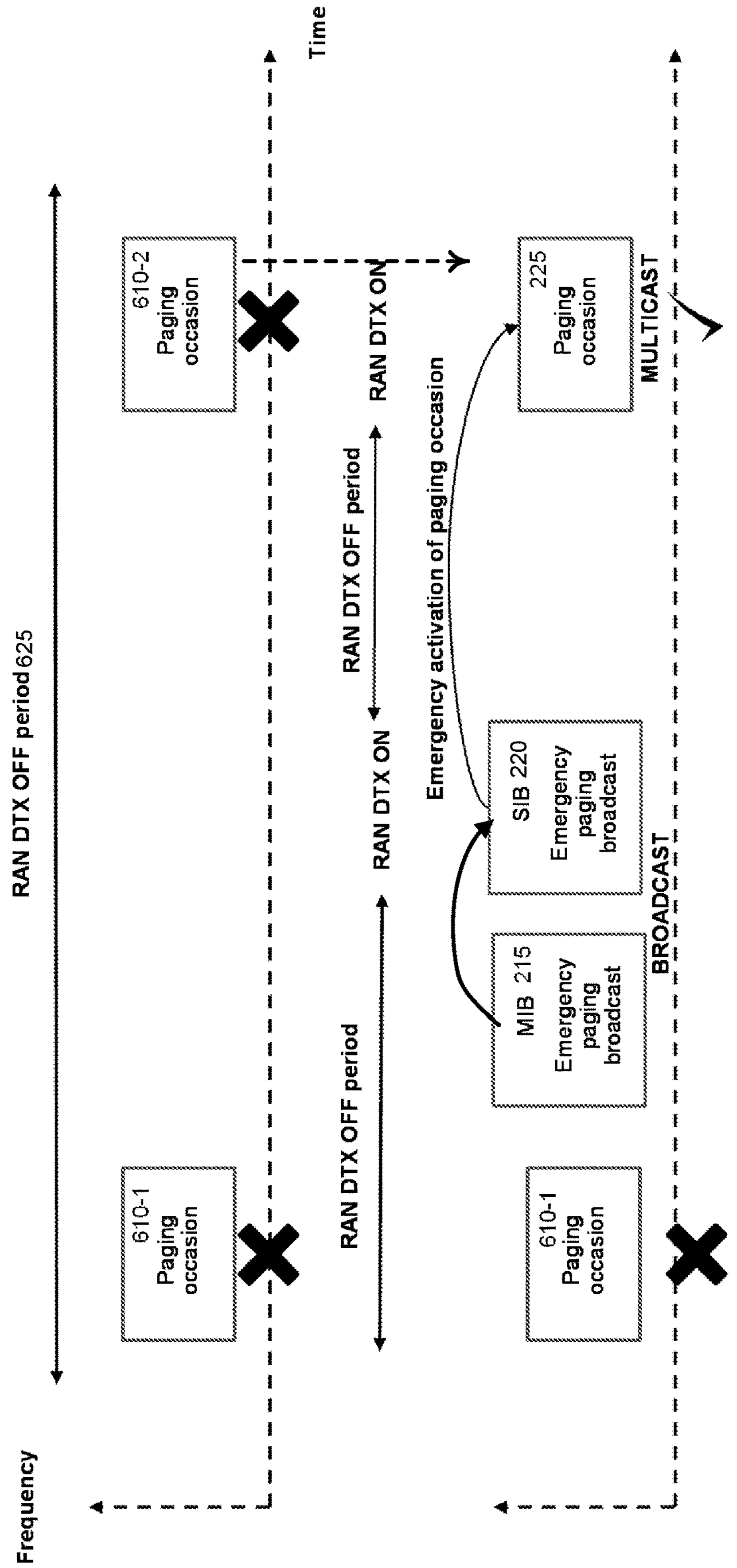
FIG. 6 illustrates a configured paging occasion being activated via a paging message indication broadcast in synchronization signal block signal transmitted by a radio network node during a configured discontinuous transmit off period.

Accordingly, as shown in FIG. 6, if a user equipment is configured to receive paging messages via paging occasions 610-1 and 610-2 (which may correspond, respectively, to occasions 1915A-1 and 1915A-2 in FIG. 19), during DTX off period 625 a RAN node may turn off transmitters during paging occasions 610-1 and 610-2 unless SSB transmission during period 625 is enabled via configuration 205. A user equipment may be configured, via configuration 210, to monitor MIB 215, which may indicate that user equipment are to monitor a conventional/existing SIB or a special emergency SIB 220. MIB 215, a conventional SIB indicated thereby, or a special SIB 220 may indicate to the user equipment to monitor paging resources that correspond to a paging occasion group that may comprise paging occasion 610-2, which is shown as activated occasion 225 in FIG. 6 to indicate that occasion 610-2 is indicated by a novel message as usable to receive a paging message during period 625. A paging message may be transmitted via occasion 225 as a multicast message that is encoded using a multicast scrambling code corresponding to a user equipment that is configured to monitor paging message occasion 610. Thus, multiple user equipment may receive MIB 512 or SIB 220, but only user equipment corresponding to a paging occasion group that is associated with occasions 610 need to remain awake to monitor occasion 225.

Figure 3:
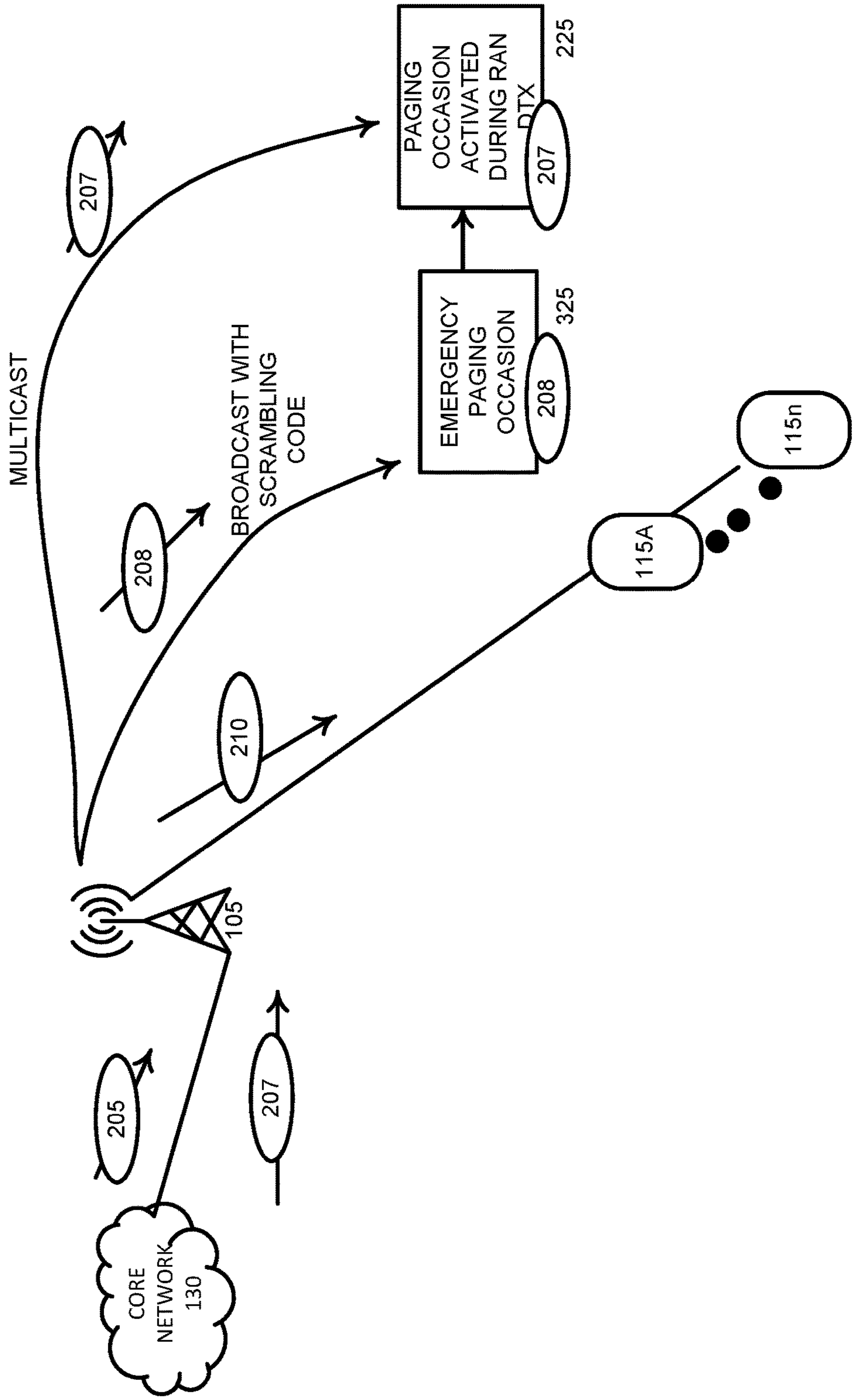
FIG. 3 illustrates an example environment with user equipment receiving a paging message indication via an emergency paging occasion during a configured discontinuous transmit off period at a serving radio access network node.

In an embodiment illustrated in FIG. 3, if configuration 205 does not enable SSB transmission during an activated DTX off period at RAN 105, unlike the embodiment described in reference to FIG. 2, there will be no available MIB or SIB transmission during an activated DTX off period, and thus emergency paging cannot be indicated by a MIB or SIB. Therefore, configuration 210 may indicate, in field 525, a separate, short, emergency-service paging resource occasion 325. Emergency occasion 325 may comprise similar information as contained in SIB 220 described in reference to FIG. 2. Emergency occasion 325, shown in FIG. 3, may indicate a paging occasion group, corresponding to a user equipment to which paging message 207 is directed. User equipment configured to monitor paging occasion resources corresponding to the indicated paging group may monitor non-emergency paging occasion resource occasion 225 to receive message 307, which may be indicative of an emergency call or emergency service. User equipment that are not configured to monitor paging occasion resources corresponding to the indicated paging group may enter an idle mode or idle state.

Figure 7:
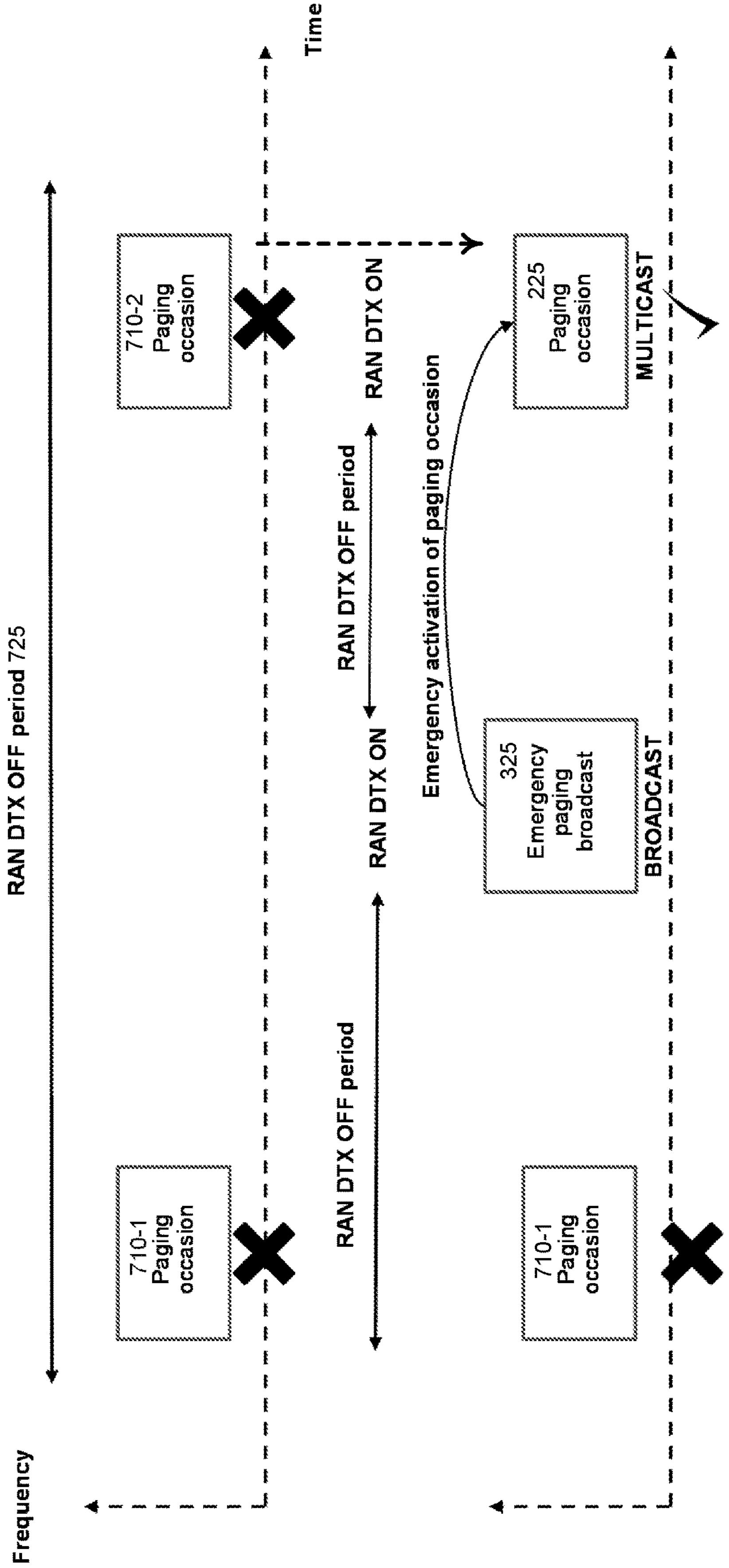
FIG. 7 illustrates an example configured paging occasion being activated via a paging message indication transmitted in an emergency paging occasion by a radio network node during a configured discontinuous transmit off period.

Thus, on condition of receiving an emergency paging indication 307 from core network 130 during a configured active RAN DTX off period activated by RAN node 105, wherein SSB transmission during DTX off periods is not enabled, RAN node 105 may transmit a paging indication 308 via special emergency paging occasion 325. As shown in FIG. 7, a paging indication broadcast via emergency paging occasion resource 325 may be scrambled by a broadcast scrambling code usable by all user equipment operating in an idle/inactive mode and may indicate the activation of one or more paging occasion groups, and therefore associated paging occasions (e.g., occasion 225), and a corresponding activation period in terms of frames or super frames. Accordingly, RAN node 105, shown in FIG. 3, can safely (e.g., with respect to regulatory requirements) shut down transmitters (e.g., activate DTX off period 725) without necessarily having to wake up during all paging occasions, including non-emergency paging resources, and thus increase NES while being able to dynamically, on-the-go, activate a paging occasion during a configured DTX off period on conditions of receiving an emergency paging message directed to a user equipment during the configured DTX off period.

A UE/WTRU device 115 may receive, from a currently selected RAN node via a radio interface link, configuration 210 indicative of at least one emergency paging occasion to be activated during active RAN discontinuous transmission off periods. Configuration 210 may comprise: an indication 515 indicative that transmission of SSB signals is halted during an active RAN DTX off period. Configuration 210 may comprise a paging group resource indication field 520, indicative of one or more paging occasion groups. Field 520 may comprise one or more paging occasion resource indications 535, indicative of one or more paging occasion resources associated with the one or more paging occasion group indications 540, indicative of one or more paging occasion groups (e.g., groups 1910, 1920, or 1930 shown in FIG. 19). Paging occasion resources indicated in field 535 may be non-emergency paging occasions. Configuration 210 may comprise one or more emergency paging occasion resource indications 525 indicative of one or more timing and/or frequency resources, usable to transmit information during paging occasions 325 shown in FIG. 3, which information may be scrambled using a broadcast scrambling code. Configuration 210 may comprise DTX off period information 530, for example DTX off period starting time, duration, and/or periodicity.

On condition of detecting an SSB broadcast by a currently selected RAN node and determining an active RAN DTX off period, UE/WTRU 115 may skip detection and decoding of corresponding device-specific or device-group-specific paging occasions (e.g., non-emergency paging occasions). Transmission during standard non-emergency paging resources is halted during the active RAN DTX off period, and therefore, user equipment skip detection of paging resources associated with potential non-emergency services.

On condition of detecting and decoding a present emergency paging message indication 208, broadcast by a currently selected RAN node as part of an active SSB, that comprises an indication of a paging group indicated by field 520 of configuration 210, UE/WTRU 115 may monitor a paging occasion associated with the paging occasion group in configuration 210. Thus, having received an emergency paging message directed to a user equipment, RAN node 105 may broadcast an emergency paging message indication, indicative of a target paging occasion group, and effectively, on-demand, activate one or more or all previously-halted paging occasions associated with the target paging group indicated by the emergency paging message indication, to carry the emergency paging message to at least one user equipment corresponding to the indicted paging occasion group. User equipment may monitor and decode a device-specific, or device-group-specific, paging occasion (e.g., a non-emergency paging occasion) using a device-specific, or device-group-specific, scrambling code.

As shown in FIG. 7, on condition of a user equipment determining that field 515 in configuration 210 indicates that transmission of SSB signals during a DTX off period implemented by a currently selected RAN node during an active RAN DTX OFF period is not enabled, the user equipment may temporarily avoid monitoring device-specific, or device-group-specific, paging occasions (e.g., configured non-emergency paging occasions) and instead monitor an emergency paging occasion 325 indicated by field 525 in configuration 210, during a RAN DTX off period indicated in configuration 210 by DTX off field 530. For example, during a RAN DTX off period without SSB signal transmission being enabled, the user equipment may adjust paging occasion detection according to non-emergency paging resources being halted during the RAN DTX OFF periods. The user equipment may temporarily avoid monitoring and decoding of conventional non-emergency paging resources corresponding to the user equipment and may use a device-specific, or device-group-specific paging scrambling code to decode an emergency paging resource set, indicated in field 525 of configuration 210, that may carry a paging indication.

On condition of decoding at least one paging resource indicated by field 525 of configuration 210, and determining that information decoded from the resource(s) indicated in field 525 (e.g., occasion 325 shown in FIG. 7) indicate a paging group, corresponding to one or more paging occasions associated with the UE based on the UE being configured to use a least one paging occasion associated with the paging occasion group in configuration 210, the UE may interrupt avoiding monitoring of paging occasions corresponding to the paging occasion group and resume monitoring and decoding the device-specific, or device-group-specific, paging occasions using a device-specific, or device-group-specific, scrambling code. Thus, according to embodiments disclosed herein, idle mode user equipment may dynamically adjust paging detection behavior with respect RAN DTX status and receive emergency paging messages regardless of user equipment operation mode (e.g., idle/inactive/connection mode operations) and regardless of RAN operation mode (e.g., regardless of DTX off period operation).

Figure 8:
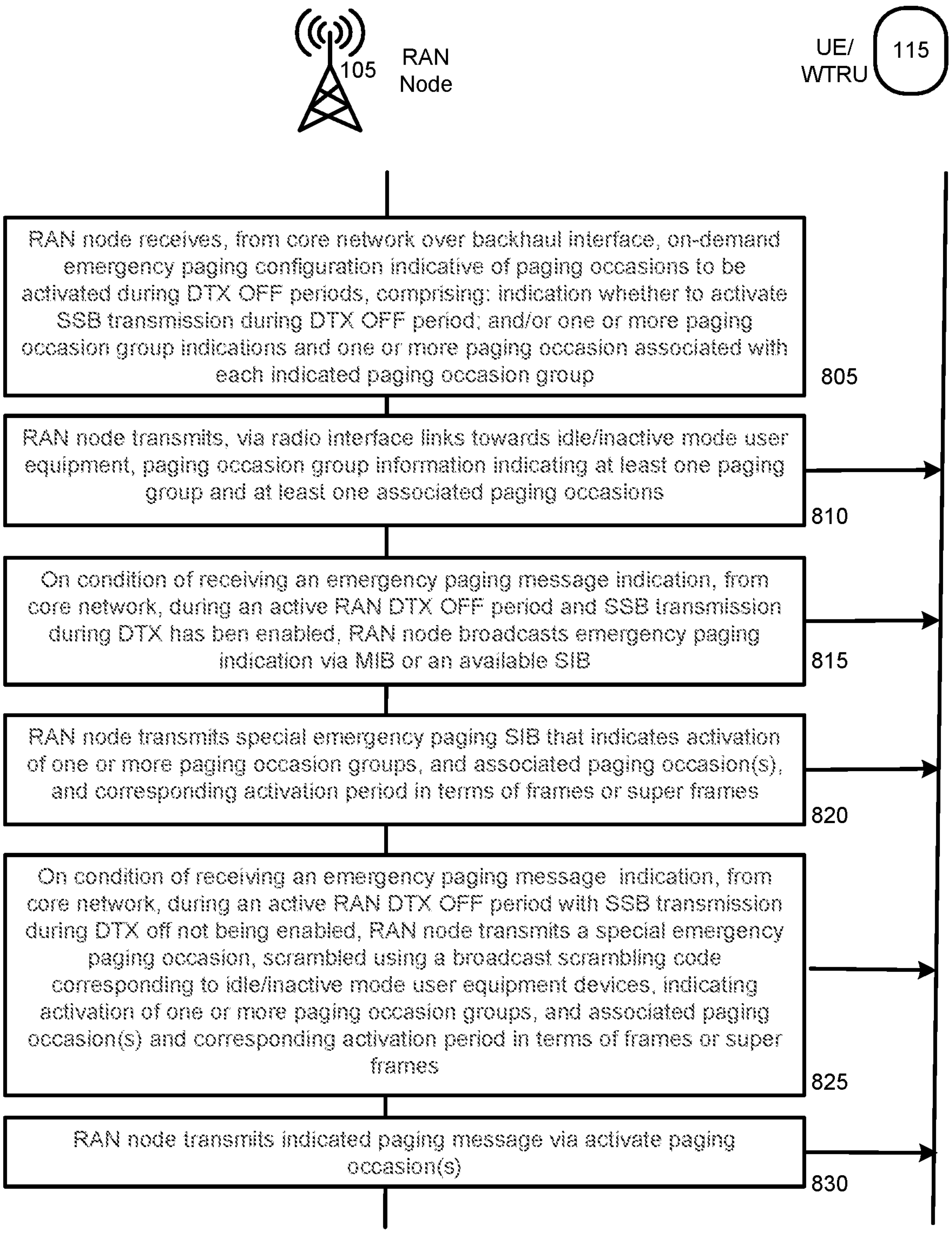
FIG. 8 illustrates a timing diagram of an example method implemented by a radio network node.

Turning now to FIG. 8, the figure illustrates a timing diagram of an example method 800. At act 805, RAN node 105 may receive, from a core network via a backhaul interface communication link, an on-demand emergency paging configuration, for example configuration 205 described in reference to FIG. 4. Configuration 205 may indicate information usable by RAN node 105 to control operation during an active discontinuous transmission off period. Configuration 205 may comprise a binary indication indicative of whether RAN 105 is to broadcast synchronization signal block during DTX off periods. Configuration 205 may comprise one or more paging occasion group indications 415 corresponding to one or more paging groups and associated one or more paging occasions associated with each paging occasion group. At act 810, RAN node 105 may transmit/broadcast paging occasion group information (e.g., configuration 210), via a radio interface link towards idle/inactive mode devices, indicating one or more available paging groups and associated paging occasions corresponding to each paging group.

On condition of receiving, from core network, an emergency paging message indication indicative of an emergency paging message directed to UE 115 during an active RAN DTX off period, and on condition of configuration 205 being indicative of SSB transmission during DTX off being configured, RAN node 105 may transmit, at act 815, an emergency paging indication, which may be a binary indication, or a bit, as part of the broadcast master information block or any of configured and available (e.g., not configured to be used for a different purpose) system information block. At act 820, RAN node 105 may compile and transmit a special emergency paging SIB indicative of one or more paging occasion groups being activated, and thus one or more associated paging occasions being activated, for use by UE 115 during an activation period corresponding to the group paging occasion resources, for example in terms of frames or super frames. On condition of receiving an emergency paging message indication, from core network, during an active RAN DTX off period wherein transmission by RAN 105 of SSB signals during active DTX off periods is not enabled, RAN node 105 may compile and transmit, at act 825, a special emergency paging occasion, scrambled with a broadcast scrambling code corresponding to all idle/inactive mode devices including UE 115, indicating the activation of at least one emergency paging occasion resource associated with at least one paging occasion, and a corresponding activation period in terms of frames or super frames. At act 830, RAN 105 may transmit an indicated paging message via an activated emergency paging occasion indicated by the indication broadcast at act 825.

Figure 9:
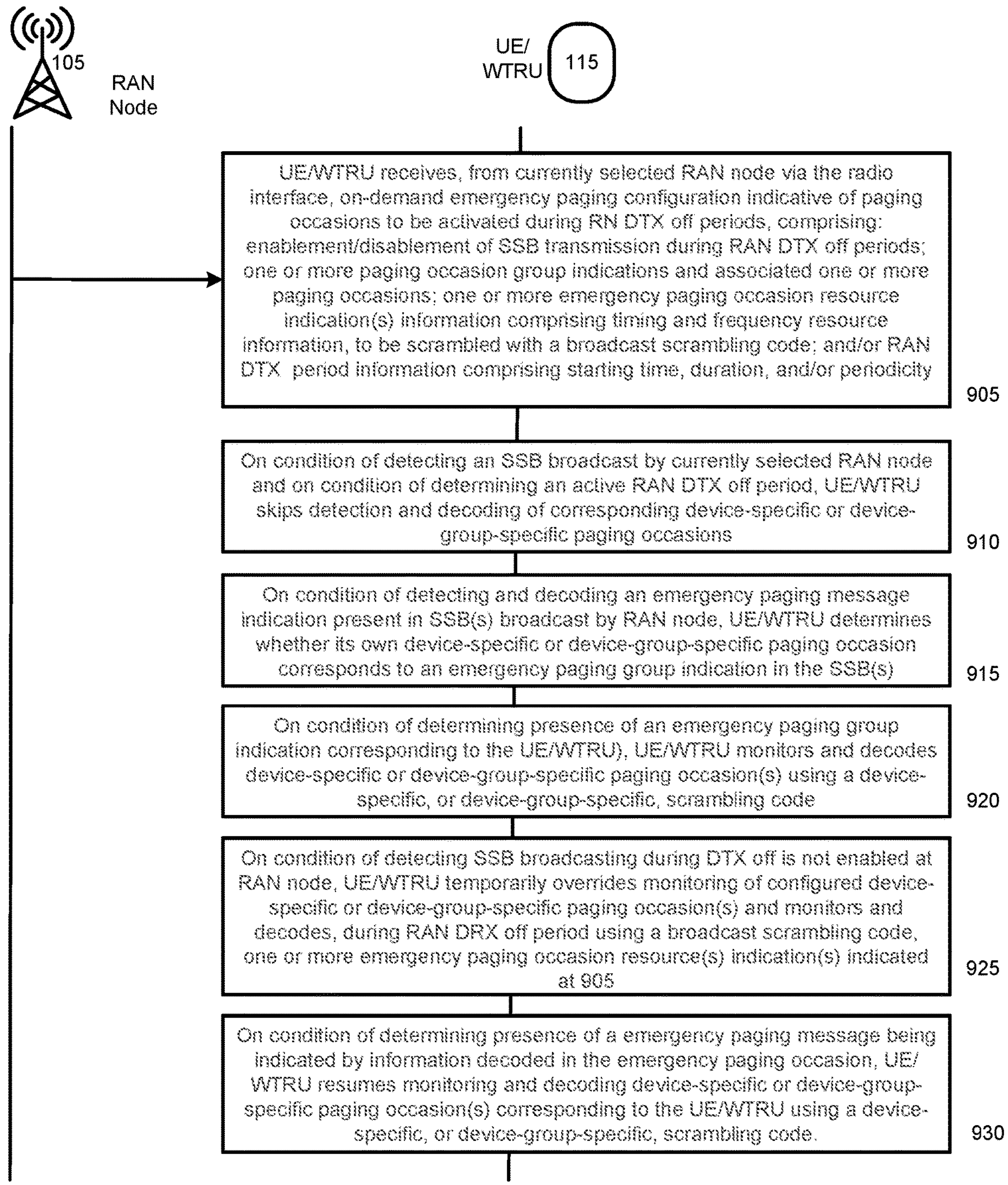
FIG. 9 illustrates a timing diagram of an example method implemented by a user equipment.

Turning now to FIG. 9, the figure illustrates a timing diagram of an example method 900. At act 905, UE/WTRU 115 may receive an on-demand emergency paging configuration, for example configuration 210 described in reference to FIG. 5, indicative of whether paging occasions are to be activated during active discontinuous transmission off periods activated by RAN 105. Configuration 210 may be received from currently selected RAN node 105 via a radio interface link between the RAN node and UE 115. Configuration 210 may comprise an indication, which may be a binary indication or a bit, indicative of whether transmission of synchronization signal block signals during RAN DTX OFF periods is to be halted. Configuration 210 may comprise one or more paging occasion group indications, indicative of one or more paging occasion groups, and one or more paging occasions associated with each paging occasion group. Configuration 210 may comprise one or more emergency paging occasion indications indicative of one or more paging occasion resources (e.g., paging occasion timing and frequency resource information), that may carry information to be scrambled with a broadcast scrambling code, which configuration 210 may comprise. Configuration 210 may comprise RAN DTX off period information, including DTX off period starting time, duration, and/or periodicity.

On condition of UE detecting an SSB broadcast by currently selected RAN node 105 and determining an active RAN DTX off period, for example based on information contained in configuration 210, at act 910 UE/WTRU 115 may skip detection and decoding of a configured 'normal' or 'standard' device-specific, or device-group-specific, paging occasion corresponding to the UE/WTRU. On condition of detecting and decoding an emergency paging indication delivered via the currently selected RAN node 105 as part of an SSB signal (MIB or SIB), UE/WTRU 115 may determine at act 915 whether a device-specific, or a device-group-specific, paging occasion corresponding to the UE is indicated by an emergency paging group indication, which may be indicated in a special SIB (e.g., SIB 220 shown in FIG. 2). On condition of determining that an emergency paging group indication indicates one or more paging occasions associated with UE/WTRU 115, the UE/WTRU may interrupt avoiding of monitoring and decoding paging occasions corresponding to the user equipment, or corresponding to a paging occasion group to which the UE corresponds, and may resume at act 920 monitoring and decoding device-specific, or device-group-specific, paging occasions using a device-specific, or device-group-specific, scrambling code. On condition of determining that configuration 210 indicates that SSB transmission during a DTX off period activated by RAN node 105 is disabled, UE/WTRU may temporarily override monitoring of device-specific, or device-group-specific, paging occasions and instead, at act 925, monitor an emergency paging occasion, indicated in configuration field 525 of configuration 210, during the activated RAN DTX OFF period. UE/WTRU may monitor and decode, at act 925, the emergency paging occasion, using a broadcast scrambling code, and determine whether the monitored emergency paging occasion indicated by field 525 of configuration 210 is indicative of a paging message to be transmitted via a paging occasion group corresponding to the UE/WTRU. On condition determining at act 925 that the emergency paging occasion comprises an indication of an emergency paging message directed to a user equipment that is a member of an indicated paging occasion group that corresponds to UE 115, UE/WTRU 115 may resume at act 930 monitoring and decoding device-specific, or device-group-specific, paging occasion(s) using a device-specific or device-group-specific scrambling code.

Figure 10:
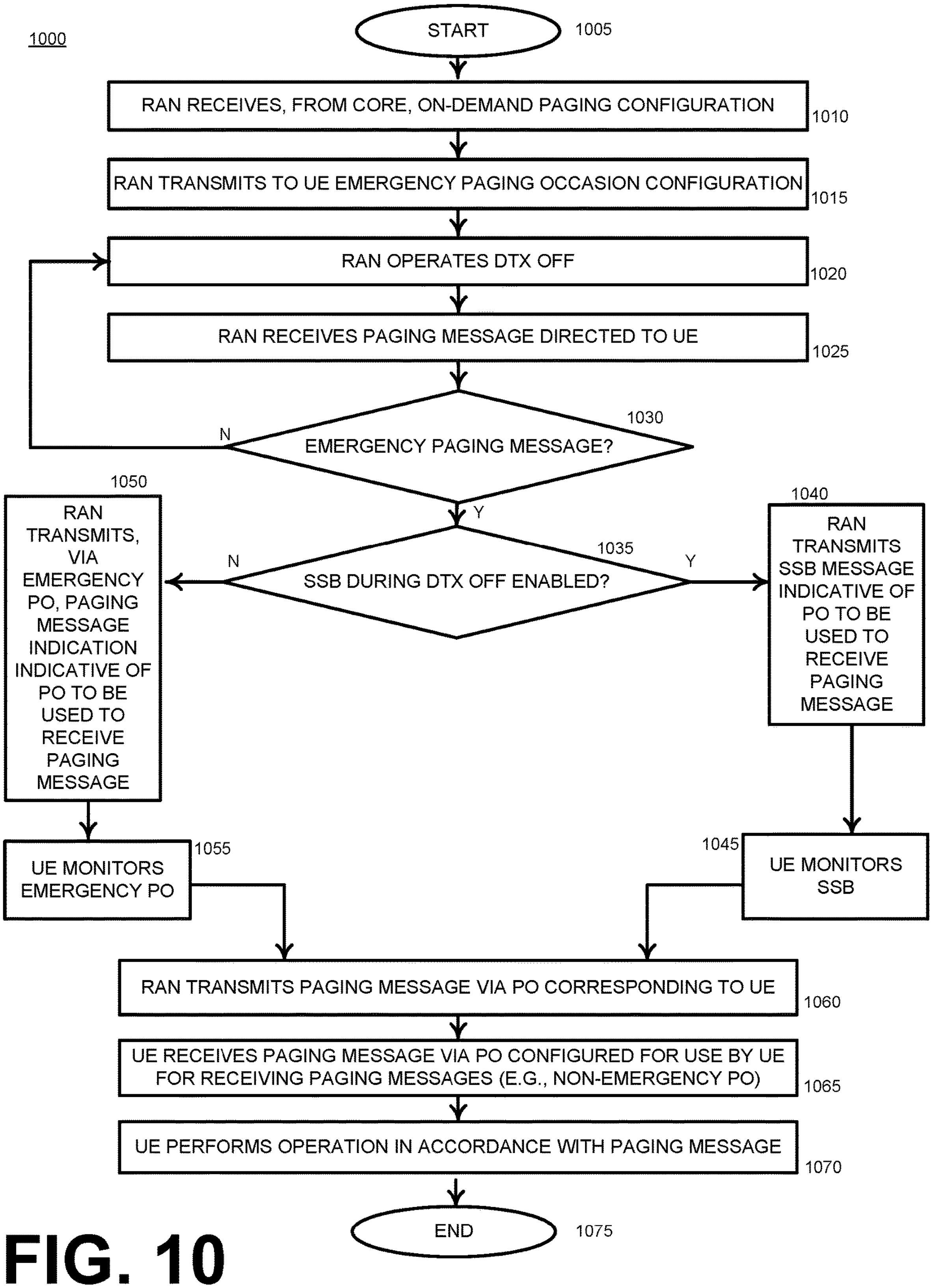
FIG. 10 illustrates a flow diagram of an example method.

Turning now to FIG. 10, the figure illustrates a flow diagram of an example method 1000. Method 1000 begins at act 1005. At act 1010, a radio access network node may receive from a core network element an on demand paging configuration, for example configuration 205 described in reference to FIG. 3. Configuration 205 may comprise an emergency synchronization signal block activation indication (e.g., indication 410 shown in FIG. 4) indicative to the radio network node to activate, or enable, broadcasting of at least one synchronization signal block signal during the activated discontinuous transmit off period to facilitate delivery of a paging message comprising important information or emergency information to at least one user equipment. Configuration 205 may comprise at least one paging occasion group indication (e.g., indicated in field 415 shown in FIG. 4) associated with at least one paging occasion group non-emergency paging resource that is to be usable by at least one user equipment corresponding to the at least one paging group indication. The at least one paging occasion group indication may be indicative of one or more paging occasions that have been configured for use by one or more user equipment. Accordingly, the one or more paging occasions that have been configured for use by user equipment corresponding to a paging occasion group may be non-emergency/normal/standard paging occasions that are usable by user equipment during non-activated DTX off operation (e.g., the group paging occasions may be usable by user equipment corresponding to a paging occasion group when the radio network node has not deactivated operation of one or more transmitters).

Figure 5:
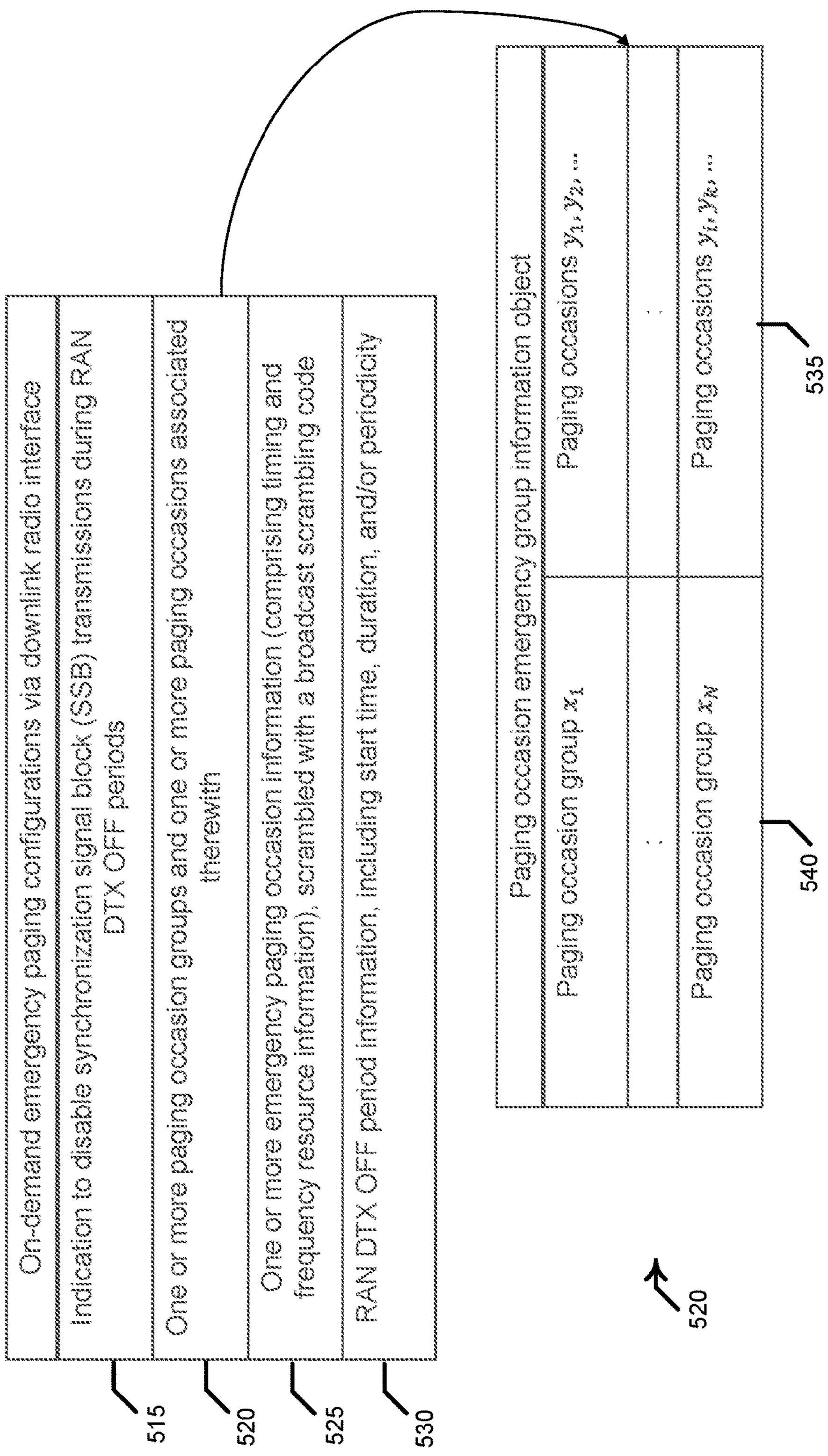
FIG. 5 illustrates an example on-demand emergency paging configuration.

At act 1015, the radio network node may transmit to one or more user equipment an emergency paging occasion configuration, for example configuration 210 described in reference to FIG. 5. The emergency paging occasion configuration may comprise an emergency information block enablement indication (e.g., indicated in field 515 of configuration 210) indicative of whether the radio network node has been configured to, or is enabled to, transmit synchronization signal block signals during an activated DTX off period. The emergency paging occasion configuration may comprise at least one paging group indication (e.g., indicated in field 520 of configuration 210) indicative of at least one paging occasion group. A paging occasion group indication may be associated, in the emergency paging occasion configuration, with one or more paging occasion resources, or one or paging occasion resource indications indicative thereof, which may correspond to non-emergency paging occasion resources that a user equipment corresponding to an associated group is configured to use when DTX off is not activated by the radio network node. For example, in reference to FIG. 19, one or more user equipment may be configured to use one or more paging occasion resources 1915A or 1915B corresponding to paging occasion group 1910. Thus, as shown in FIG. 19, when DTX off operation is not active at the radio network node, a user equipment that has been configured to use paging occasions 1915A and/or 1915B may monitor paging occasions 1915A and/or 1915B to determine whether a paging message directed to the user equipment has been transmitted by the radio network node. During DTX off operation by the radio network node, if a paging group indication, corresponding to paging occasion group 1910, has been transmitted by the radio network node in an emergency paging occasion configuration, user equipment configured to monitor paging occasion resources 1915A or 1915B may determine to monitor paging occasions 1915A or 1915B if the user equipment receives a paging message indication from the radio access network node, during active DTX off operation of the RAN node, indicative of paging occasion group 1910.

The emergency paging occasion configuration may comprise an emergency paging resource indication (e.g., indicated in field 525 of configuration 210) indicative of at least one emergency paging resource, corresponding to at least one emergency paging occasion resource, usable by user equipment to monitor the at least one emergency paging occasion resource if field 515 is indicative that SSB transmission, by the radio network node during DTX off, is not enabled. The emergency paging occasion configuration may comprise DTX off period information in field 530 of configuration 210 that may be indicative to user equipment of when the radio network node will operate a DTX off period.

At act 1020, the radio network node may activate DTX off operation, thus deactivating one or more transmitters during a DTX off period indicated to one or more user equipment via field 530 in configuration 210. At act 1025, during operation of the activated DTX off period, the radio access network node may receive a paging message directed to one or more user equipment that have received configuration 210. At act 1030, the radio network node may determine whether the paging message received at act 1025 is an emergency paging message corresponding to an emergency service. In an embodiment, the user equipment may determine at act 1030 whether the paging message received at act 1025 is an important paging message that may not correspond to an emergency service but may correspond to a premium service for which a user of a user equipment that has received configuration 210 has paid a subscription premium to an operator of the radio network node or for which a sender of the paging message received that 1025 has paid a premium to an operator of the radio network node. For purposes of description, regardless of whether a paging message received at act 1025 corresponds to an emergency service or an important service, the paging message received at act 1025 may be referred to as an emergency paging message. If the radio network node determines at act 1030 that a paging message received at act 1025 does not correspond to an emergency service, method 1000 may return to act 1020 and the radio network node may continue to operate DTX off according to DTX off information that may have been indicated in field 530 of configuration 210.

Returning to the description of act 1030, if the radio access network node determines that a paging message received at act 1025 corresponds to an emergency service, method 1000 may advance to act 1035. At act 1035, radio access network node may determine whether configuration 205 comprises emergency synchronization signal block activation indication in field 410, which indication may be referred to as an emergency information block enablement indication. If the radio network node determines, at act 1035, that broadcasting of synchronization signal block message signals (e.g., MIB or SIB signals) is enabled according to field 410 in configuration 205, the radio network node may transmit at act 1040 a synchronization signal block message signal indicative of paging occasion information that may be used by a user equipment to facilitate receiving of an emergency paging message, received by the radio network node at act 1025, during DTX off operation as indicated in field 530 of configuration 210. Paging occasion information may be transmitted at act 1040 via a MIB signal message. A MIB signal message transmitted at act 1040 may be indicative of a SIB message, which may be a SIB message transmitted at act 1040 and that may by a system SIB message configured, or allocated, for use by the radio network node (e.g., a dynamic SIB message type). In an embodiment, paging occasion information transmitted at act 1025 may be transmitted via a special SIB, which may be referred to as an emergency SIB (e.g., SIB 220 shown in FIG. 2) designated for the purpose of delivering paging information usable by a user equipment to facilitate monitoring of at least one paging occasion during DTX off operation. If configuration 210 indicates in field 515 that the radio network node is enabled to broadcast synchronization signal block signal messages during DTX off operation, user equipment may monitor, at act 1025, synchronization signal block signal resources corresponding to the radio network node.

At act 1060, the radio network node may transmit the paging message received at act 1025 via at least one paging occasion resource, corresponding to a paging occasion group indicated in field 520 of configuration 210. The radio network node may scramble the paging message transmitted and act 1060 using a scrambling code corresponding to a paging occasion group indicated in field 520 of configuration 210 or using a scrambling code corresponding to a user equipment corresponding to the paging occasion group indicated in field 520. If a user equipment that monitors synchronization signal block message signals at act 1045 determines that a monitored synchronization signal block message, for example SIB 220 shown in FIG. 2, indicates that an emergency paging message has been directed to a paging occasion group corresponding to the user equipment, the user equipment may monitor, at act 1065, a paging occasion resource corresponding to the paging group. The user equipment may use a paging occasion group scrambling code, or a scrambling code specific to the user equipment, to descramble an emergency paging message transmitted at act 1060. At act 1070, the user equipment that receives and descrambles at act 1065 the emergency paging message that was transmitted by the radio network node at act 1060 may operate according to information or instruction associated with the paging message. Method 1000 advances to act 1075 and ends.

Returning to description of act 1035, if the radio network node determines that field 410 of configuration 205 does not enable the radio network node to transmit synchronization signal block signals during DTX off operation, the radio network node may transmit, at act 1050 via an emergency paging occasion resource indicated in field 525 of configuration 210, a paging message indication. The paging message indication transmitted at act 1050 may be broadcast using a broadcast scrambling code usable indicated in field 525 of configuration 210. At act 1055, user equipment corresponding to a paging occasion group indicated in field 520 of configuration 210 and indicated in the paging message indication transmitted at act 1050 may monitor the emergency paging occasion resource(s) indicated in field 525 of configuration 210 using a broadcast scrambling code that corresponds to the user equipment, or that corresponds to emergency paging occasion resource indicated in field 525. In an embodiment, the broadcast scrambling code used by the radio network node at act 1050 to transmit a paging message indication via an emergency paging occasion and used by the user equipment at act 1055 to descramble the paging message indication broadcast at act 1050 may have been previously configured to the user equipment (e.g., during RRC connection establishment) or the broadcast scrambling code may be indicated in field 525 of configuration 210.

The paging message indication descrambled from the emergency paging occasion at act 1055 may comprise the same, or similar, information as an emergency synchronization signal block signal message (e.g., SIB 220) monitored by the user equipment at act 1045. The radio network node may transmit, at act 1060, the paging message received at act 1025, as described above. At act 1065, user equipment, corresponding to the paging occasion group indicated in the emergency paging message indication descrambled from the emergency paging occasion monitored at 1055, may monitor and receive the emergency paging message, received by the radio network node at act 1025, via a paging occasion resource corresponding to the user equipment, or corresponding to the paging occasion, corresponding to the user equipment, indicated in the paging message indication transmitted at act 1050. At act 1070, the user equipment may operate according to information indicated in, or indicated by, the paging message received at act 1065. Method 1000 advances to act 1075 and ends.

Accordingly, even though the radio network node may activate DTX off operation to reduce power consumption by the radio network node, the radio network node may nevertheless deliver an emergency paging message to a user equipment without totally deactivating DTX operation because one or more transmitters at the radio network node do not need to be operational to support transmission of paging messages during all configured paging occasions. For example, a paging message may be received by the radio network node at act 1025 that is directed to a user equipment, corresponding to a paging occasion group 1930, that has been configured to use, or that has determined to use, paging occasion resources 1915C shown in FIG. 19. Regardless of whether transmission of SSB signals during DTX off is enabled at the radio network node, the radio network node may only need to activate a transmitter to transmit an SSB signal and then a paging message during paging occasion resource 1915C-1. If the radio network node is not configured to transmit SSB signals during DTX off, the radio network node may only need to activate a transmitter to transmit an emergency paging message indication via an emergency paging occasion resource indicated in field 525 of configuration 210 and then transmit an emergency paging message during paging occasion 1915C-1. Thus, the radio network node may remain in DTX off operation during most of DTX off period 1925, shown in FIG. 19, except to transmit an SSB signal or to transmit a short emergency paging message indication via emergency paging occasion 325 and to transmit the actual emergency paging message via paging occasion resource 1915C-1 during period 1940. Instead of deactivating one or more transmitters only during time gaps 1905-0-1905-5, which would be the case if the radio network node is not configured to broadcast SSB signals or emergency paging message indication 325 during DTX off period 1925, the node can deliver an emergency paging message to a user equipment configured to use paging occasion 1915C-1 and only deactivate DTX off operation to transmit an SSB or, during emergency paging occasion 325 (configured via field 525 in configuration 210), to transmit an emergency paging message indication at act 1050 shown in FIG. 10 and during paging occasion 1915C-1 to transmit an actual paging message. By implementing DTX off for most of period 1925 and only activating transmitters during emergency paging occasion 325 and paging occasion 1915C-1, the radio network node can operate DTX off during much more of period 1925 than if the node can only deactivate transmitters during gaps 1905 as required by conventional techniques.

Figure 11:
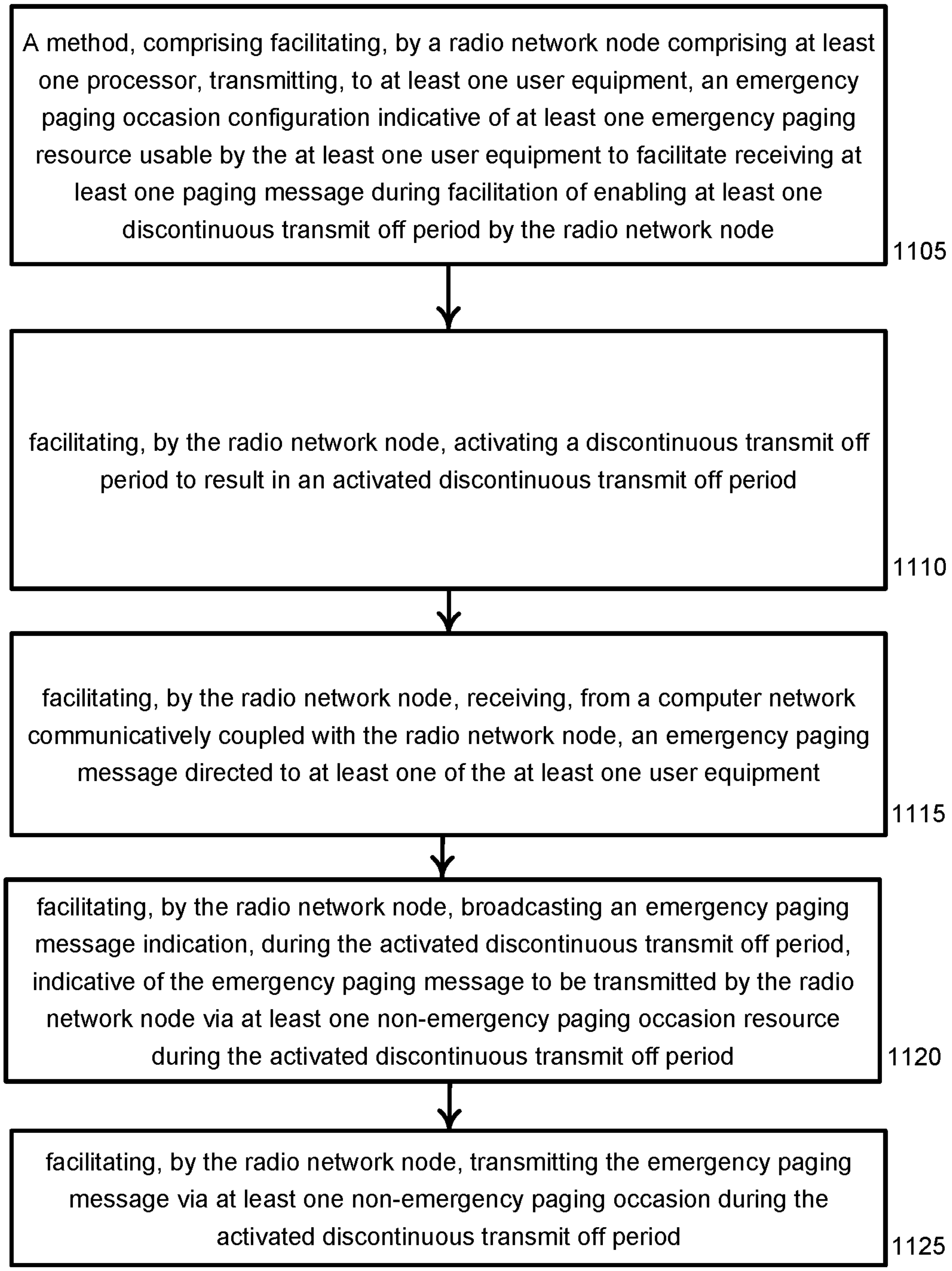
FIG. 11 illustrates a block diagram of an example method.

Turning now to FIG. 11, the figure illustrates an example embodiment method 1100 comprising at block 1105 facilitating, by a radio network node comprising at least one processor, transmitting, to at least one user equipment, an emergency paging occasion configuration indicative of at least one emergency paging resource usable by the at least one user equipment to facilitate receiving at least one paging message during facilitation of enabling at least one discontinuous transmit off period by the radio network node; at block 1110 facilitating, by the radio network node, activating a discontinuous transmit off period to result in an activated discontinuous transmit off period; at block 1115 facilitating, by the radio network node, receiving, from a computer network communicatively coupled with the radio network node, an emergency paging message directed to at least one of the at least one user equipment; at block 1120 facilitating, by the radio network node, broadcasting an emergency paging message indication, during the activated discontinuous transmit off period, indicative of the emergency paging message to be transmitted by the radio network node via at least one non-emergency paging occasion resource during the activated discontinuous transmit off period; and at block 1125 facilitating, by the radio network node, transmitting the emergency paging message via at least one non-emergency paging occasion during the activated discontinuous transmit off period.

Figure 12:
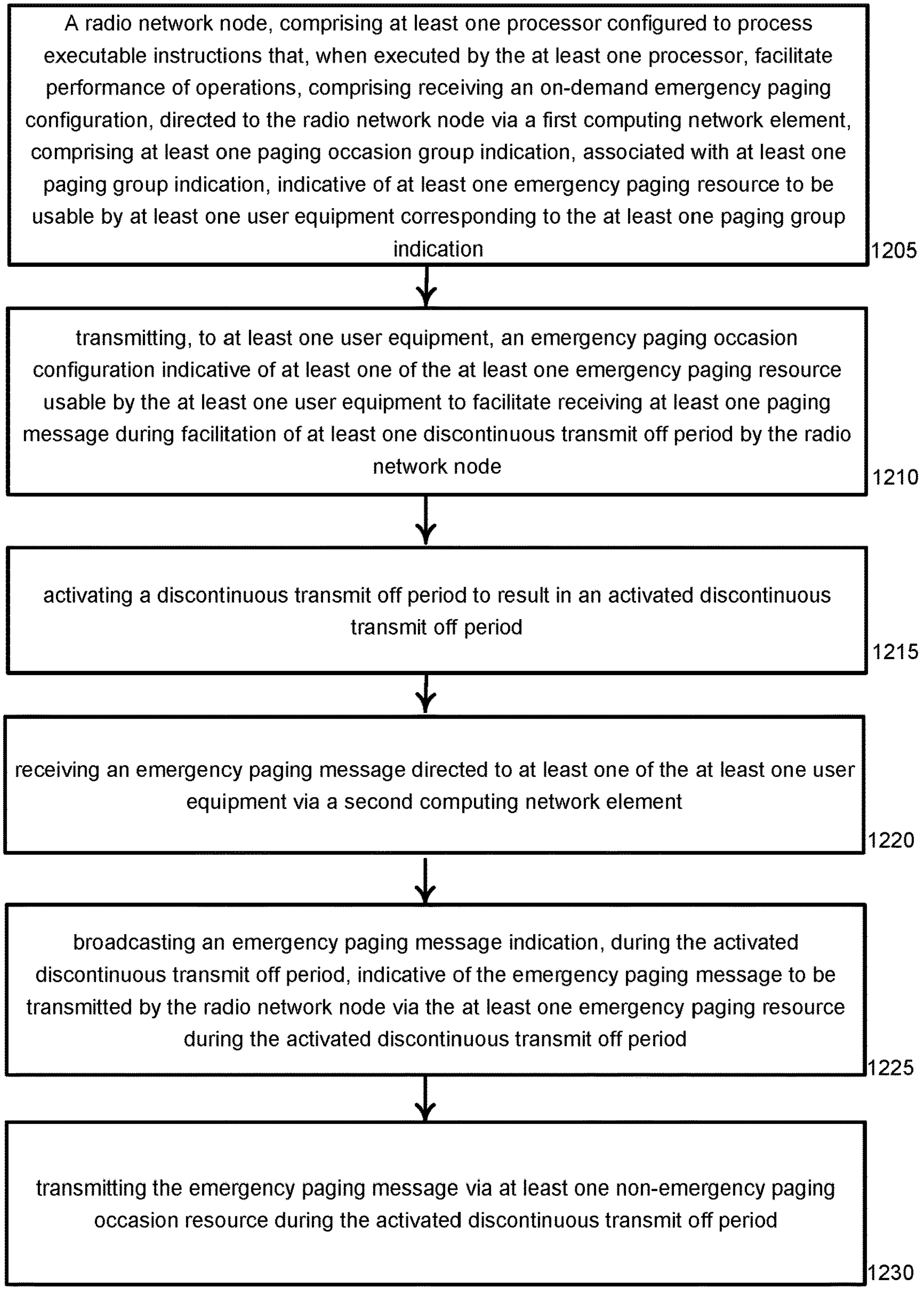
FIG. 12 illustrates a block diagram of an example radio network node.

Turning now to FIG. 12, the figure illustrates a radio network node 1200, comprising at block 1205 at least one processor configured to process executable instructions that, when executed by the at least one processor, facilitate performance of operations, comprising receiving an on-demand emergency paging configuration, directed to the radio network node via a first computing network element, comprising at least one paging occasion group indication, associated with at least one paging group indication, indicative of at least one emergency paging resource to be usable by at least one user equipment corresponding to the at least one paging group indication; at block 1210 transmitting, to at least one user equipment, an emergency paging occasion configuration indicative of at least one of the at least one emergency paging resource usable by the at least one user equipment to facilitate receiving at least one paging message during facilitation of at least one discontinuous transmit off period by the radio network node; at block 1215 activating a discontinuous transmit off period to result in an activated discontinuous transmit off period; at block 1220 receiving an emergency paging message directed to at least one of the at least one user equipment via a second computing network element; at block 1225 broadcasting an emergency paging message indication, during the activated discontinuous transmit off period, indicative of the emergency paging message to be transmitted by the radio network node via the at least one emergency paging resource during the activated discontinuous transmit off period; and at block 1230 transmitting the emergency paging message via at least one non-emergency paging occasion resource during the activated discontinuous transmit off period.

Figure 13:
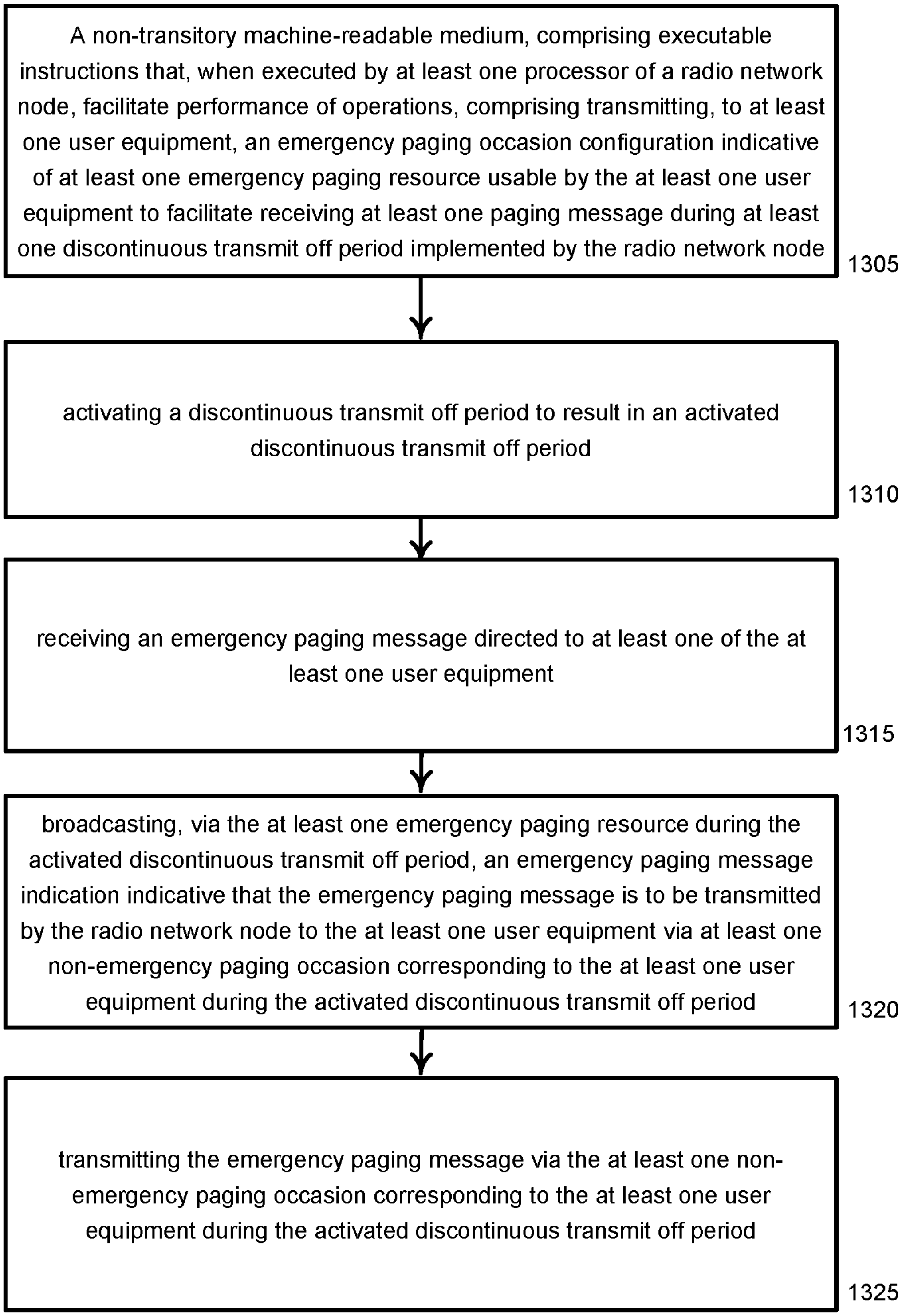
FIG. 13 illustrates a block diagram of an example non-transitory machine-readable medium.

Turning now to FIG. 13, the figure illustrates a non-transitory machine-readable medium 1300 comprising at block 1305 executable instructions that, when executed by at least one processor of a radio network node, facilitate performance of operations, comprising transmitting, to at least one user equipment, an emergency paging occasion configuration indicative of at least one emergency paging resource usable by the at least one user equipment to facilitate receiving at least one paging message during at least one discontinuous transmit off period implemented by the radio network node; at block 1310 activating a discontinuous transmit off period to result in an activated discontinuous transmit off period; at block 1315 receiving an emergency paging message directed to at least one of the at least one user equipment; at block 1320 broadcasting, via the at least one emergency paging resource during the activated discontinuous transmit off period, an emergency paging message indication indicative that the emergency paging message is to be transmitted by the radio network node to the at least one user equipment via at least one non-emergency paging occasion corresponding to the at least one user equipment during the activated discontinuous transmit off period; and at block 1325 transmitting the emergency paging message via the at least one non-emergency paging occasion corresponding to the at least one user equipment during the activated discontinuous transmit off period.

Figure 14:
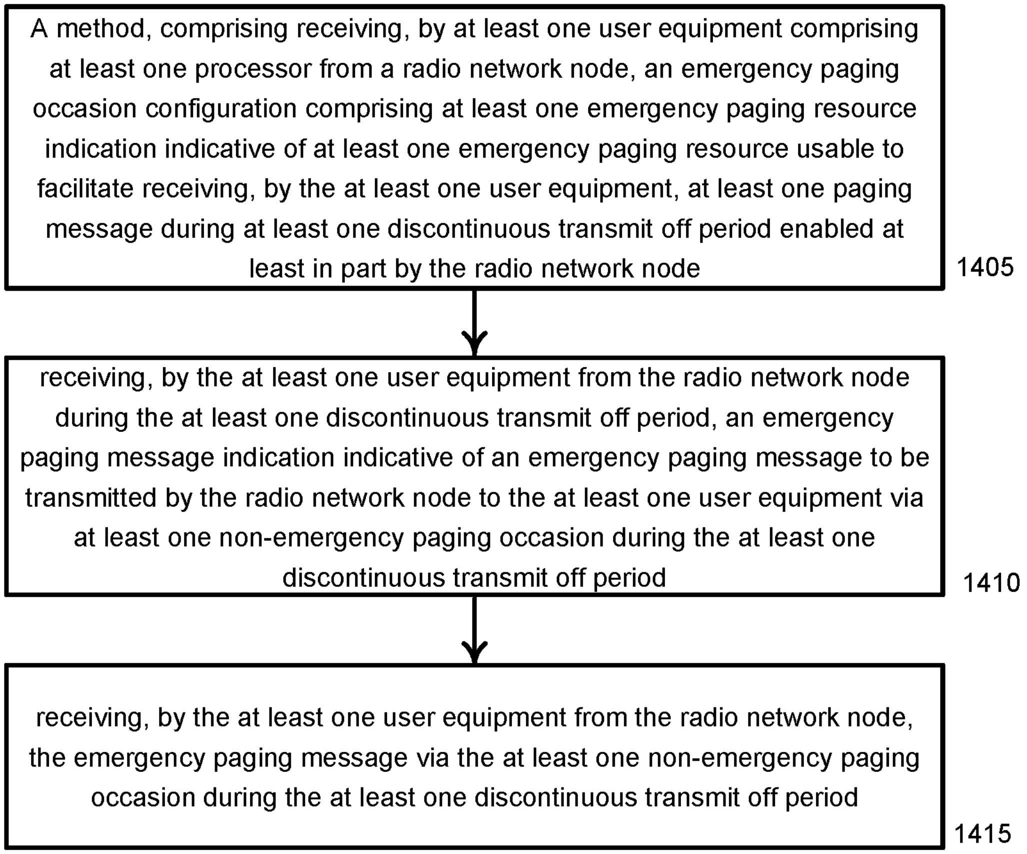
FIG. 14 illustrates a block diagram of another example method.

Turning now to FIG. 14, the figure illustrates an example embodiment method 1400 comprising at block 1405 receiving, by a user equipment comprising at least one processor from a radio network node, an emergency paging occasion configuration comprising at least one emergency paging resource indication indicative of at least one emergency paging resource usable to facilitate receiving, by the at least one user equipment, at least one paging message during at least one discontinuous transmit off period enabled at least in part by the radio network node; at block 1410 receiving, by the at least one user equipment from the radio network node during the at least one discontinuous transmit off period, an emergency paging message indication indicative of an emergency paging message to be transmitted by the radio network node to the at least one user equipment via at least one non-emergency paging occasion during the at least one discontinuous transmit off period; and at block 1415 receiving, by the at least one user equipment from the radio network node, the emergency paging message via the at least one non-emergency paging occasion during the at least one discontinuous transmit off period.

Figure 15:
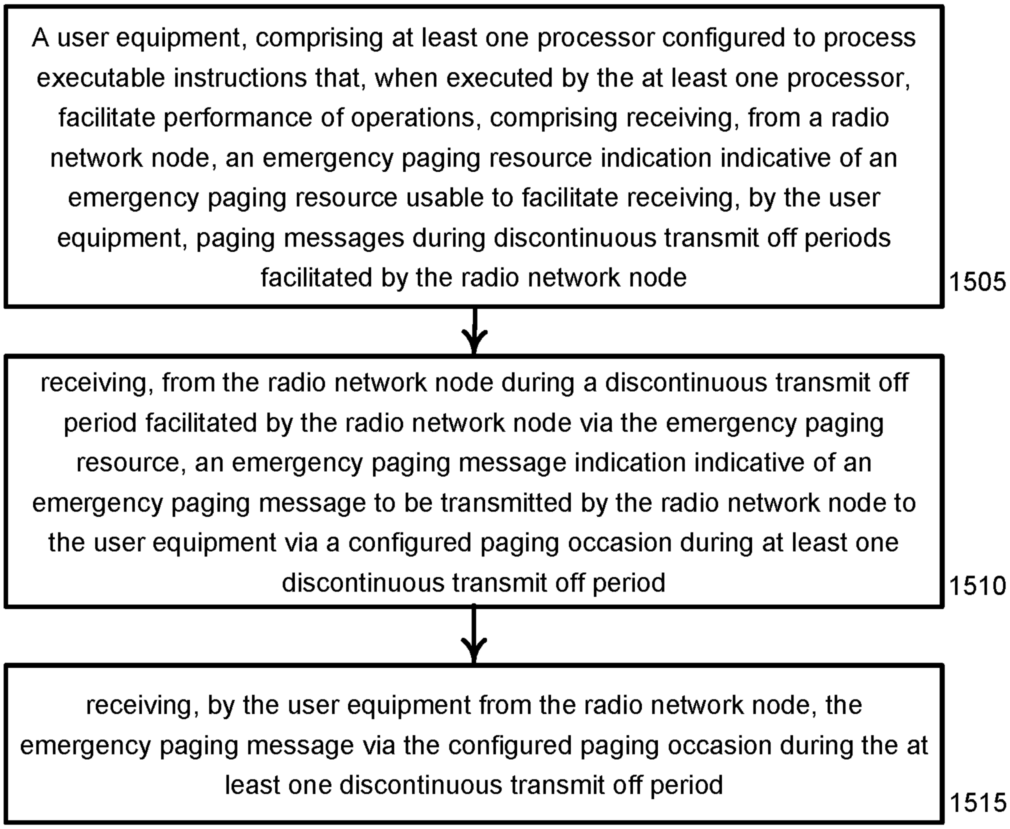
FIG. 15 illustrates a block diagram of an example user equipment.

Turning now to FIG. 15, the figure illustrates an example user equipment 1500, comprising at block 1505 at least one processor configured to process executable instructions that, when executed by the at least one processor, facilitate performance of operations, comprising receiving, from a radio network node, an emergency paging resource indication indicative of an emergency paging resource usable to facilitate receiving, by the user equipment, paging messages during discontinuous transmit off periods facilitated by the radio network node; at block 1510 receiving, from the radio network node during a discontinuous transmit off period facilitated by the radio network node via the emergency paging resource, an emergency paging message indication indicative of an emergency paging message to be transmitted by the radio network node to the user equipment via a configured paging occasion during at least one discontinuous transmit off period; and at block 1515 receiving, by the user equipment from the radio network node, the emergency paging message via the configured paging occasion during the at least one discontinuous transmit off period.

Figure 16:
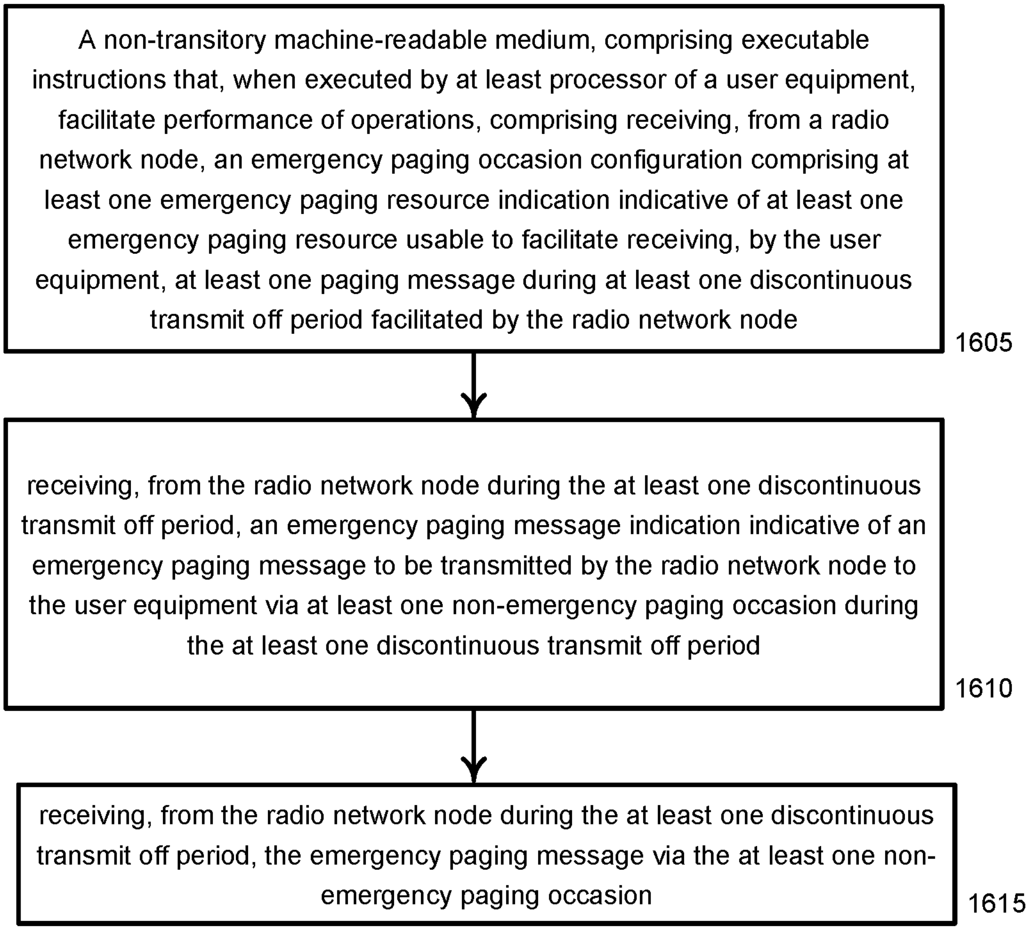
FIG. 16 illustrates a block diagram of another example non-transitory machine-readable medium.

Turning now to FIG. 16, the figure illustrates a non-transitory machine-readable medium 1600 comprising at block 1605 executable instructions that, when executed by at least processor of a user equipment, facilitate performance of operations, comprising receiving, from a radio network node, an emergency paging occasion configuration comprising at least one emergency paging resource indication indicative of at least one emergency paging resource usable to facilitate receiving, by the user equipment, at least one paging message during at least one discontinuous transmit off period facilitated by the radio network node; at block 1610 receiving, from the radio network node during the at least one discontinuous transmit off period, an emergency paging message indication indicative of an emergency paging message to be transmitted by the radio network node to the user equipment via at least one non-emergency paging occasion during the at least one discontinuous transmit off period; and at block 1615 receiving, from the radio network node during the at least one discontinuous transmit off period, the emergency paging message via the at least one non-emergency paging occasion.

Figure 17:
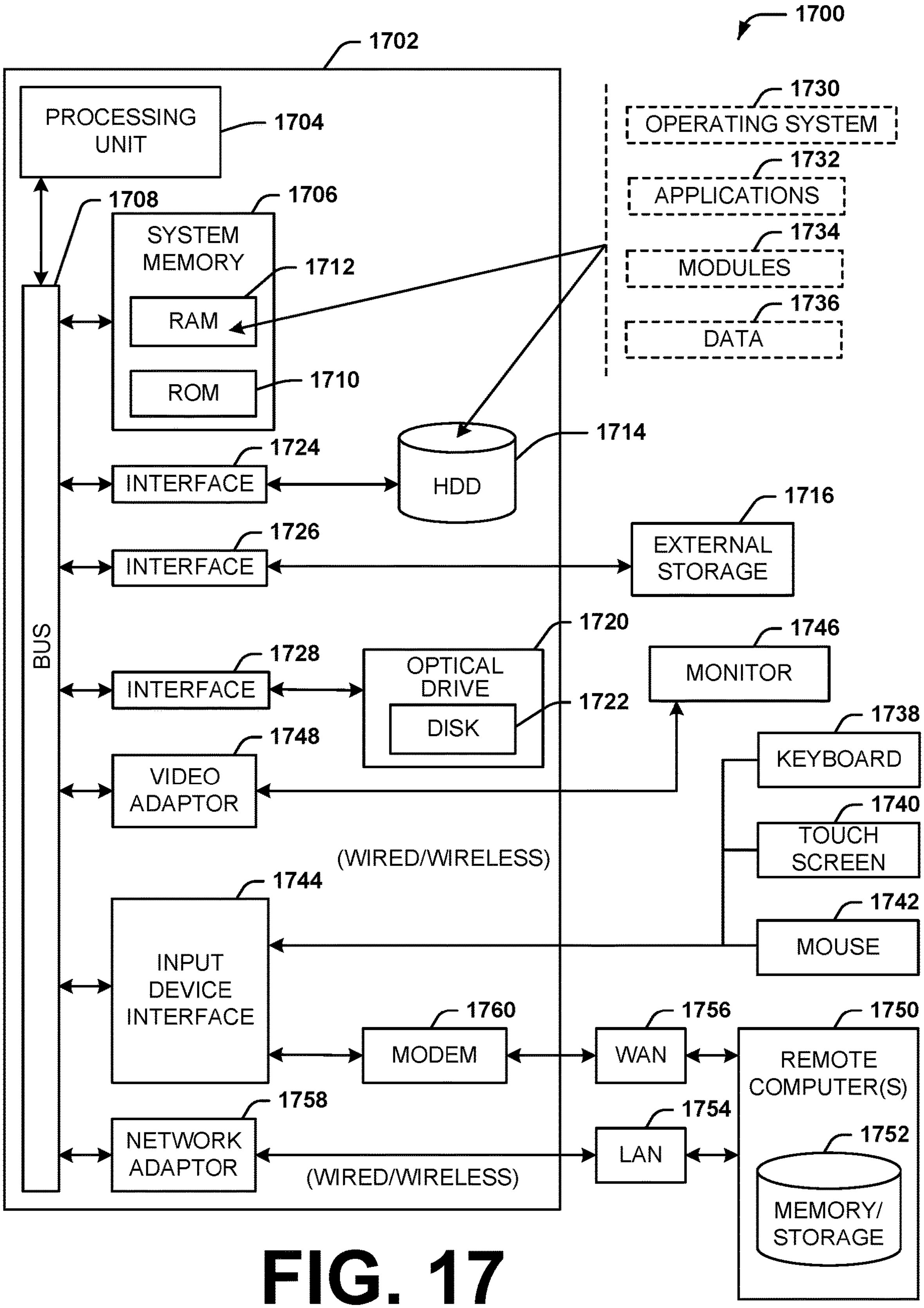
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
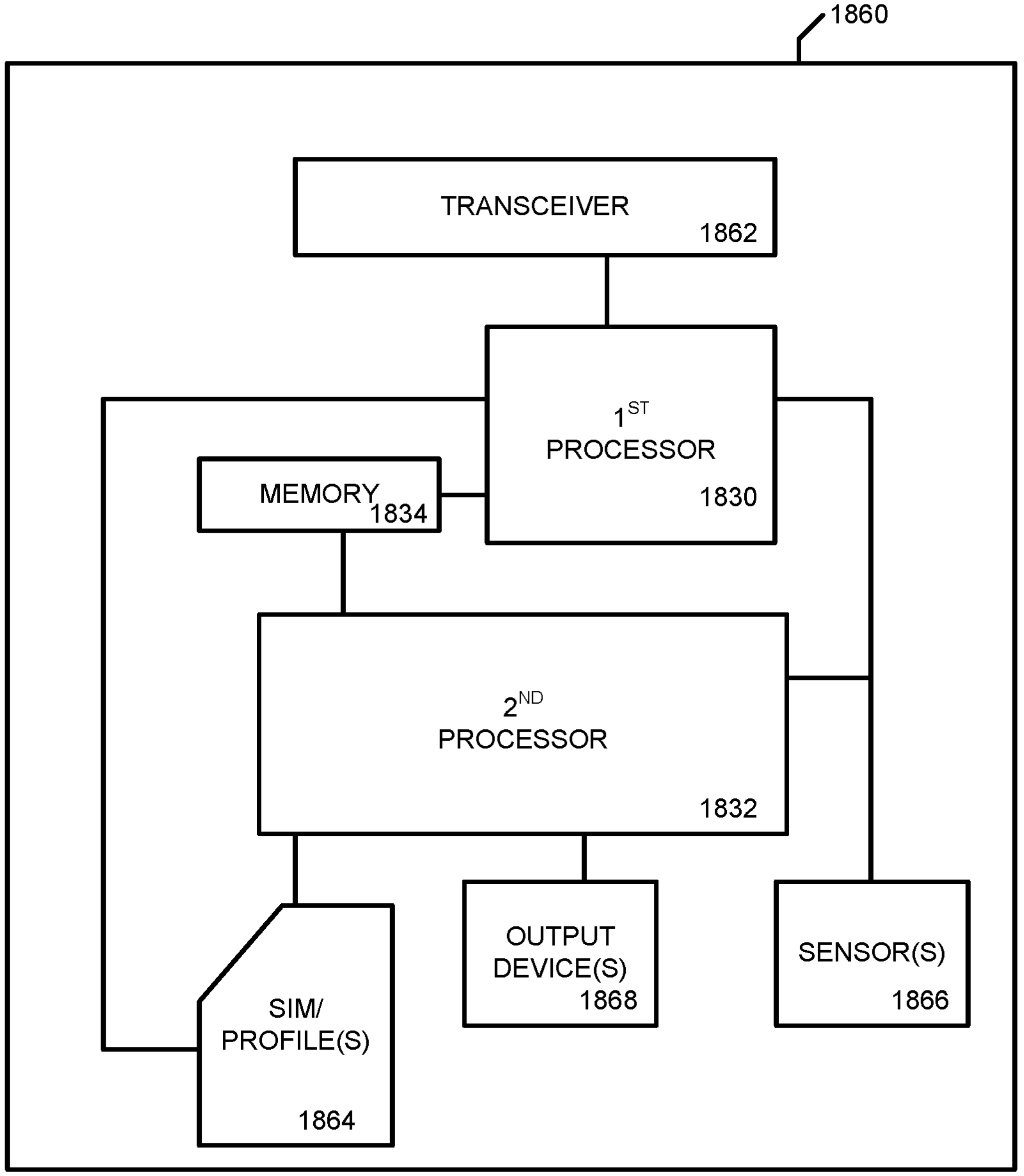
FIG. 18 illustrates a block diagram of an example wireless UE.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |

TABLE 1-continued

| Term | Definition |
|---|---|
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio network node comprising at least one processor, transmitting, to at least one user equipment, an emergency paging occasion configuration indicative of at least one emergency paging resource usable by the at least one user equipment to facilitate receiving at least one paging message during facilitation of enabling at least one discontinuous transmit off period by the radio network node;

facilitating, by the radio network node, activating a discontinuous transmit off period to result in an activated discontinuous transmit off period;

facilitating, by the radio network node, receiving, from a computer network communicatively coupled with the radio network node, an emergency paging message directed to at least one of the at least one user equipment;

facilitating, by the radio network node, broadcasting an emergency paging message indication, during the activated discontinuous transmit off period, indicative of the emergency paging message to be transmitted by the radio network node via at least one non-emergency paging occasion resource during the activated discontinuous transmit off period; and facilitating, by the radio network node, transmitting the emergency paging message via at least one non-emergency paging occasion during the activated discontinuous transmit off period.

2. The method of claim 1, wherein the computer network communicatively coupled with the radio network node comprises a core network.

3. The method of claim 1, wherein the emergency paging message indication comprises an emergency paging activation period indication indicative of an emergency activation period during which the at least one non-emergency paging occasion resource is to be usable by the at least one user equipment to receive the emergency paging message during the activated discontinuous transmit off period.

4. The method of claim 3, wherein the emergency paging activation period indication is indicated by the emergency paging message indication as at least one frame or as at least one super frame.

5. The method of claim 1, further comprising:

facilitating, by the radio network node, receiving, via the computer network communicatively coupled with the radio network node, an on-demand emergency paging configuration comprising at least one of:

an emergency synchronization signal block activation indication indicative to the radio network node to activate broadcasting of at least one synchronization signal block signal during the activated discontinuous transmit off period, or at least one paging occasion resource indication, indicative of the at least one non-emergency paging resource, associated with at least one paging occasion group indication indicative that the at least one non-emergency paging resource is to be usable, during the activated discontinuous transmit off period, by at least one user equipment corresponding to the at least one non-emergency paging resource.

6. The method of claim 5, wherein the emergency paging message indication comprises at least one of the at least one paging occasion group indication.

7. The method of claim 5, wherein the on-demand emergency paging configuration further comprises an emergency information block enablement indication indicative that the radio network node is to enable broadcasting of emergency information block messages during the activated discontinuous transmit off period, wherein the emergency paging message indication is broadcast via a master information block message.

8. The method of claim 5, wherein the on-demand emergency paging configuration further comprises an emergency information block enablement indication indicative that the radio network node is to enable broadcasting of emergency information block messages during the activated discontinuous transmit off period, and wherein the emergency paging message indication is broadcast via an emergency system information block message indicated by a master information block message broadcast by the radio network node.

9. The method of claim 5, wherein an emergency information block enablement indication indicative of enablement of broadcasting of emergency information block messages during the activated discontinuous transmit off period is absent from the on-demand emergency paging configuration, wherein the at least one emergency paging resource comprises at least one emergency paging occasion resource usable by the at least one user equipment to receive the emergency paging message indication, wherein the broadcasting of the emergency paging message indication comprises transmitting the emergency paging message indication via the at least one emergency paging occasion resource, wherein the emergency paging message indication is scrambled with a broadcast scrambling code, and wherein the emergency paging message comprises at least one of the at least one paging group indication indicative to the at least one user equipment to monitor the at least one non-emergency paging occasion resource to facilitate receiving the emergency paging message.

10. The method of claim 9, wherein the emergency paging message indication excludes user equipment identifiers corresponding to user equipment associated with the at least one paging group indication.

11. The method of claim 9, wherein the emergency paging occasion configuration further comprises an emergency paging activation period indication indicative of an emergency activation period during which the at least one non-emergency paging occasion resource is to be usable by the at least one user equipment to receive the emergency paging message during the activated discontinuous transmit off period.

12. The method of claim 9, wherein the emergency paging message indication comprises an emergency paging activation period indication indicative of an emergency activation period during which the at least one non-emergency paging occasion is to be usable by the at least one user equipment to receive the emergency paging message during the activated discontinuous transmit off period.

13. A radio network node, comprising at least one processor configured to process executable instructions that, when executed by the at least one processor, facilitate performance of operations, comprising:

receiving an on-demand emergency paging configuration, directed to the radio network node via a first computing network element, comprising at least one paging occasion group indication, associated with at least one paging group indication, indicative of at least one emergency paging resource to be usable by at least one user equipment corresponding to the at least one paging group indication;

transmitting, to at least one user equipment, an emergency paging occasion configuration indicative of at least one of the at least one emergency paging resource usable by the at least one user equipment to facilitate receiving at least one paging message during facilitation of at least one discontinuous transmit off period by the radio network node;

activating a discontinuous transmit off period to result in an activated discontinuous transmit off period;

receiving an emergency paging message directed to at least one of the at least one user equipment via a second computing network element;

broadcasting an emergency paging message indication, during the activated discontinuous transmit off period, indicative of the emergency paging message to be transmitted by the radio network node via the at least one emergency paging resource during the activated discontinuous transmit off period; and transmitting the emergency paging message via at least one non-emergency paging occasion resource during the activated discontinuous transmit off period.

14. The radio network node of claim 13, wherein the on-demand emergency paging configuration further comprises an emergency synchronization signal block activation indication indicative to the radio network node to activate broadcasting of at least one synchronization signal block signal during the activated discontinuous transmit off period.

15. The radio network node of claim 14, wherein the on-demand emergency paging configuration further comprises an emergency information block enablement indication indicative that the radio network node is to enable broadcasting of emergency information block messages during the activated discontinuous transmit off period, and wherein the operations further comprise:

broadcasting, via the at least one emergency paging resource, an emergency master information block message, wherein the emergency master information block message is indicative of a system information block message that comprises the emergency paging message indication indicative of the at least one non-emergency paging occasion resource; and broadcasting the system information block message.

16. A non-transitory machine-readable medium, comprising executable instructions that, when executed by at least one processor of a radio network node, facilitate performance of operations, comprising:

transmitting, to at least one user equipment, an emergency paging occasion configuration indicative of at least one emergency paging resource usable by the at least one user equipment to facilitate receiving at least one paging message during at least one discontinuous transmit off period implemented by the radio network node;

activating a discontinuous transmit off period to result in an activated discontinuous transmit off period;

receiving an emergency paging message directed to at least one of the at least one user equipment;

broadcasting, via the at least one emergency paging resource during the activated discontinuous transmit off period, an emergency paging message indication indicative that the emergency paging message is to be transmitted by the radio network node to the at least one user equipment via at least one non-emergency paging occasion corresponding to the at least one user equipment during the activated discontinuous transmit off period; and transmitting the emergency paging message via the at least one non-emergency paging occasion corresponding to the at least one user equipment during the activated discontinuous transmit off period.

17. The non-transitory machine-readable medium of claim 16, wherein the at least one emergency paging resource is an emergency paging occasion, and wherein the emergency paging message indication is broadcast via the emergency paging occasion.

18. The non-transitory machine-readable medium of claim 17, wherein the emergency paging message indication is indicative of the at least one non-emergency paging occasion.

19. The non-transitory machine-readable medium of claim 18, wherein the emergency paging occasion configuration comprises at least one paging occasion group indication and at least one paging occasion resource indication associated with the at least one paging occasion group indication, wherein the at least one paging occasion resource indication is indicative of the at least one non-emergency paging occasion, and wherein the emergency paging message is multicast to the at least one user equipment, configured to monitor the at least one non-emergency paging occasion, according to encoding information corresponding to the at least one user equipment.

20. The non-transitory machine-readable medium of claim 16, wherein the operations further comprise:

receiving, from a core network device, an on-demand emergency paging configuration further comprises an emergency information block enablement indication indicative that the radio network node is to enable broadcasting of emergency information block messages during the activated discontinuous transmit off period;

based on the emergency information block enablement indication being indicative to enable broadcasting of synchronization signal block messages, broadcasting a master information block message that is indicative of an emergency system information block message that comprises the emergency paging message indication indicative of the at least one non-emergency paging occasion; and broadcasting the emergency system information block message during the activated discontinuous transmit off period.

* * * * *